United States Patent
Stefik et al.

(10) Patent No.: US 12,409,432 B2
(45) Date of Patent: Sep. 9, 2025

(54) PERSISTENT MICELLE CORONA CHEMISTRY

(71) Applicant: UNIVERSITY OF SOUTH CAROLINA, Columbia, SC (US)

(72) Inventors: Morgan Stefik, Columbia, SC (US); Taylor Larison, Cayce, SC (US)

(73) Assignee: UNIVERSITY OF SOUTH CAROLINA, Columbia, SC (US)

( * ) Notice: Subject to any disclaimer, the term of this patent is extended or adjusted under 35 U.S.C. 154(b) by 812 days.

(21) Appl. No.: 17/697,148

(22) Filed: Mar. 17, 2022

(65) Prior Publication Data

US 2022/0362733 A1 Nov. 17, 2022

Related U.S. Application Data

(60) Provisional application No. 63/189,381, filed on May 17, 2021.

(51) Int. Cl.
*B01J 13/04* (2006.01)
*B01J 13/18* (2006.01)
*C08F 220/06* (2006.01)

(52) U.S. Cl.
CPC ........... *B01J 13/185* (2013.01); *C08F 220/06* (2013.01)

(58) Field of Classification Search
CPC ........ B01J 13/185; B01J 13/04; C08F 220/06; C08F 220/1806; C08F 293/005; C08F 2438/03
See application file for complete search history.

(56) References Cited

U.S. PATENT DOCUMENTS 10,954,393 B2  3/2021  Stefik et al.
2020/0146987 A1* 5/2020 Stefik ................. B01J 13/08

OTHER PUBLICATIONS

Alexandridis et al., Amphiphilic Block Copolymers, Elsevier, 2000, Book. (No Abstract Available) Retrieved Mar. 10, 2023 from weblink: https://books.google.com/books?hl=en&lr=&id=HsUuCbPeiUUC&oi=fnd&pg=PP1&ots=Z48U2KL_08&sig=WoP6yNL_IRR7HUPjZDIuWQpWQDM.

Anikin et al., Polyelectrolyte-Mediated Protein Adsorption: Fluorescent Protein Binding to Individual Polyelectrolyte Nanospheres, The Journal of Physical Chemistry B Letters, vol. 109, 2005, 5418-5420. https://doi.org/10.1021/jp0506282.

Anraku et al., Size-Controlled Long-Circulating PICsome as a Ruler to Measure Critical Cut-off Disposition Size into Normal and Tumor Tissues, Chemical Communications, vol. 47, No. 21, 2011, 6054-6056. (Abstract Only) https://doi.org/10.1039/c1cc11465d.

(Continued)

*Primary Examiner* — Jiangtian Xu
(74) *Attorney, Agent, or Firm* — DORITY & MANNING, P.A.

(57) ABSTRACT

A method of forming persistent micelles is described. Particularly, methods disclosed herein include dissolving a block copolymer in a first solvent to form a dispersion containing unimers or dynamic micelles. Further, a method includes contacting the dispersion with a second solvent forming the persistent micelles. The persistent micelles formed by the method of the present disclosure can be used for controlled delivery of dispersions in organic electronic coatings, paint, or drug delivery applications and can also be used to control the pore size of films that include an oxide, a nitride, a carbide, a metal, or a carbon material.

15 Claims, 13 Drawing Sheets

(56) References Cited

OTHER PUBLICATIONS

Asri et al., An Efficient Process for Synthesizing and Hydrolyzing a Phosphonated Methacrylate: Investigation of the Adhesive and Anticorrosive Properties, Journal of Polymer Science: Part A: Polymer Chemistry, vol. 46, Issue 14, 2008, 4794-4803. https://doi.org/10.1002/pola.22813.
Bolto et al., Organic Polyelectrolytes in Water Treatment, Water Research, vol. 41, Issue 11, 2007, 2301-2324. (Abstract Only) https://doi.org/10.1016/j.watres.2007.03.012.
Borkovec et al., Ion Binding to Polyelectrolytes, Current Opinion in Colloid & Interface Science, vol. 11, Issue 5, 2006, 280-289. (Abstract Only) https://doi.org/10.1016/j.cocis.2006.08.004.
Brondino et al., Adhesive Properties onto Galvanized Steel Plates of Grafted Poly(Vinylidene Fluoride) Powders with Phosphonated Acrylates, Journal of Applied Polymer Science, vol. 72, Issue 5, 2999, 611-620. (Abstract Only) https://doi.org/10.1002/(SICI)1097-4628(19990502)72:5%3C11::AID-APP1%3E3.0.CO;2-I.
Canniccioni et al., RAFT Polymerization of Dimethyl(Methacryloyloxy)Methyl Phosphonate and its Phosphonic Acid Derivative: A New Opportunity for Phosphorus-Based Materials, Polymer Chemistry, vol. 4, No. 13, 2013, 3676-3685. (Abstract Only) http://dx.doi.org/10.1039/C3PY00426K.
Cho et al., Nanoporous Block Copolymer Micelle/Micelle Multilayer Films with Dual Optical Properties, Journal of the American Chemical Society, vol. 128, No. 30, 2006, 9935-9942. (Abstract Only) https://doi.org/10.1021/ja062437y.
Choi et al., Molecular Exchange in Ordered Diblock Copolymer Micelles, Macromolecules, vol. 44, No. 9, 2011, 3594-3604. (Abstract Only) https://doi.org/10.1021/ma102788v.
Chopra et al., Sustained Release Micellar Carrier Systems for Iontophoretic Transport of Dexamethasone Across Human Sclera, Journal of Controlled Release: Official Journal of the Controlled Release Society, vol. 160, No. 1, 2012, 96-104. https://doi.org/10.1016/j.jconrel.2012.01.032.
Dai et al., Reinforcement of Polymer Interfaces with Random Copolymers, Physical Review Letters, vol. 73, Issue 18-31, 1994, 2472-2475. (Abstract Only) https://doi.org/10.1103/PhysRevLett73.2472.
Dormidontova, Micellization Kinetics in Block Copolymer Solutions: Scaling Model, Macromolecules, vol. 32, No. 22, 1999, 7630-7644. (Abstract Only) https://doi.org/10.1021/ma9809029.
Falireas et al., Synthesis and Aqueous Solution Properties of an Amino Bisphosphonate Methacrylate Homopolymer via RAFT Polymerization, Polymers, vol. 10, No. 7, 2018, 711, 22-26. https://doi.org/10.3390/polym10070711.
Farhat et al., Ion Transport and Equilibria in Polyelectrolyte Multilayers, Langmuir, vol. 17, No. 4, 2001, 1184-1192. https://doi.org/10.1021/la001298+.
Ge et al., Polyelectrolyte-Promoted Forward Osmosis-Membrane Distillation (FO—MD) Hybrid Process for Dye Wastewater Treatment, Environmental Science & Technology, vol. 46, No. 11, 2012, 6236-6243. (Abstract Only) https://doi.org/10.1021/es300784h.
Graillot et al., Synthesis by RAFT of Innovative Well-Defined (co)polymers From a Novel Phosphorus-Based Acrylamide Monomer, Polymer Chemistry, vol. 4, Issue 3, 2013, 795-803. https://dx.doi.org/10.1039/c2py20720f.
Guo et al., Parallel Control over Surface Charge and Wettability Using Polyelectrolyte Architecture: Effect on Protein Adsorption and Cell Adhesion, ACS Applied Materials & Interfaces, vol. 8, No. 44, 2016, 30552-30563. (Abstract Only) https://doi.org/10.1021/acsami.6609481.
Halperin et al., Polymeric Micelles: Their Relaxation Kinetics, Macromolecules, vol. 22, No. 5, 1989, 2403-2412. (Abstract Only) https://doi.org/10.1021/ma00195a069.
Han et al., Effect of pH on the Structure and Drug Release Profiles of Layer-by-Layer Assembled Films Containing Polyelectrolyte, Micelles, and Graphene Oxide, Scientific Reports, vol. 6, Article No. 24158, 2016, 10 Pages. https://doi.org/10.1038/srep24158.
Harris et al., Ion Transport and Interfacial Dynamics in Disordered Block Copolymers of Ammonium-Based Polymerized Ionic Liquids, Macromolecules, vol. 51, No. 9, 2018, 3477-3486. (Abstract Only) https://doi.org/10.1021/acs.macromol.7b02729.
Hu et al., Controlled Rupture of Magnetic Polyelectrolyte Microcapsules for Drug Delivery, Langmuir, vol. 24, No. 20, 2008, 11811-11818. (Abstract Only) https://doi.org/10.1021/la801138e.
Jain et al., Consequences of Nonergodicity in Aqueous Binary PEO-PB Micellar Dispersions, Materials Science, Macromolecules, vol. 37, No. 4, 2004, 1511-1523. (Abstract Only) http://dx.doi.org/10.1021/ma035467j.
Jang et al., Phosphonated Polymers with Fine-Tuned Ion Clustering Behavior: Toward Efficient Proton Conductors, Macromolecules, vol. 51, No. 3, 2018, 1120-1128. (Abstract Only) https://doi.org/10.1021/acs.macromol.7b02449.
Justyna et al., The McKenna Reaction—Avoiding Side Reactions in Phosphonate Deprotection, Beilstein Journal of Organic Chemistry, vol. 16, 2020, 1436-1446. https://doi.org/10.3762%2Fbjoc.16.119.
Kataoka et al., Block Copolymer Micelles for Drug Delivery: Design, Characterization and Biological Significance, Advanced Drug Delivery Reviews, vol. 64, Supp, 2012, 34-48. (Abstract Only) https://doi.org/10.1016/j.addr.2012.09.013.
Keddie et al., RAFT Agent Design and Synthesis, Macromolecules, vol. 45, Issue 13, 2012, 5321-5620. https://doi.org/10.1021/ma300410v.
Kelley et al., Size Evolution of Highly Amphiphilic Macromolecular Solution Assemblies Via a Distinct Bimodal Pathway, Nature Communications, vol. 5, Article No. 3599, 2014, 10 Pages. https://doi.org/10.1038/ncomms4599.
Kelly et al., Intrinsic Properties of Polyelectrolyte Multilayer Membranes: Erasing the Memory of the Interface, Langmuir, vol. 34, No. 13, 2018, 3874-3883. (Abstract Only) https://doi.org/10.1021/acs.langmuir.8b00336.
Kembaren et al., Balancing Enzyme Encapsulation Efficiency and Stability in Complex Coacervate Core Micelles, Langmuir, vol. 36, No. 29, 2020, 8494-8502. https:/doi.org/10.1021/acs.langmuir.0c01073.
Krasemann et al., Selective Ion Transport across Self-Assembled Alternating Multilayers of Cationic and Anionic Polyelectrolytes, Langmuir, vol. 16, No. 2, 2000, 287-290. (Abstract Only) https://doi.org/10.1021/a991240z.
Lai et al., Hypromellose-Graft-Chitosan and Its Polyelectrolyte Complex as Novel Systems for Sustained Drug Delivery, ACS Applied Materials & Interfaces, vol. 7, No. 19, 2015, 10501-10510. https://doi.org/10.1021/acsami.5b01984.
Lantz et al., Full Gamut Wall Tunability from Persistent Micelle Templates via Ex Situ Hydrolysis, Nano-Micro Small, vol. 15, Issue 18, 1900393, 2019. (Abstract Only) https://doi.org/10.1002/smll.201900393.
Larison et al., Persistent Micelle Corona Chemistry Enables Constant Micelle Core Size with Independent Control of Functionality and Polyelectrolyte Response, Langmuir, vol. 37, No. 32, 2021, 9817-9825. https:/doi.org/10.1021/acs.langmuir.1c01384.
Lee et al., Structure of pH-Dependent Block Copolymer Micelles: Charge and Ionic Strength Dependence, Macromolecules, vol. 35, No. 22, 2002, 8540-8551. https://doi.org/10.1021/ma0114842.
Lee et al., Super pH-Sensitive Multifunctional Polymeric Micelle for Tumor pHe Specific TAT Exposure and Multidrug Resistance, Journal of Controlled Release, vol. 129, Issue 3, 2008, 228-236. https://doi.org/10.1016/j.iconrel.2008.04.024.
Li et al., Self-Assembly of Random Copolymers, Chemical Communications, vol. 50, Issue 88, 2014, 13417-13432. https://doi.org/10.1039/C4CC03688C.
Lu et al., Addition of Corona Block Homopolymer Retards Chain Exchange in Solutions of Block Copolymer Micelles, Macromolecules, vol. 49, No. 4, 2016, 1405-1413. https://doi.org/10.1021/acs.macromol.5b02395.
Lu et al., Chain Exchange in Binary Copolymer Micelles at Equilibrium: Confirmation of the Independent Chain Hypothesis, ACS Macro Letters, vol. 2, No. 5, 2013, 451-455. (Abstract Only) https://doi.org/10.1021/mz400167x.

(56) References Cited

OTHER PUBLICATIONS

Lu et al., Molecular Exchange in Diblock Copolymer Micelles: Bimodal Distribution in Core-Block Molecular Weights, ACS Macro Letters, vol. 1, No. 8, 2012, 982-985. (Abstract Only) https://doi.org/10.1021/mz300285x.

Lu et al., Remarkable Effect of Molecular Architecture on Chain Exchange in Triblock Copolymer Micelles, Macromolecules, vol. 48, No. 8, 2015, 2667-2676. (Abstract Only) https://doi.org/10.1021/acs.macromol.5b00294.

Lund et al. Equilibrium Chain Exchange Kinetics of Diblock Copolymer Micelles: Tuning and Logarithmic Relaxation, Macromolecules, vol. 39, No. 13, 2006, 4566-4575. https://doi.org/10.1021/ma060328y.

Luo et al., Thermodynamic Size Control of Block Copolymer Vesicles in Solution, Langmuir, vol. 17, No. 22, 2001, 6804-6811. (Abstract Only) https://doi.org/10.1021/la0104370.

Mark, Polymer Data Handbook, Oxford University Press, Inc., 1999, 390-393.

Meli et al., Path-Dependent Morphology and Relaxation Kinetics of Highly Amphiphilic Diblock Copolymer Micelles in Ionic Liquids, Macromolecules, vol. 43, No. 4, 2010, 2018-2027. (Abstract Only) https://doi.org/10.1021/ma902366c.

Milsom et al., Layer-by-Layer Deposition of Open-Pore Mesoporous TiO2—Nafion® Film Electrodes, Journal of Solid State Electrochemistry, vol. 11, 2007, 1109-1117. https://hdl.handle.net/2134/3035 ; https://doi.org/10.1007/s10008-006-0247-3.

Monge et al., Chapter 1: Polymerization of Phosphorus-Containing (Meth)acrylate Monomers, Phosphorus-Based Polymers: from Synthesis to Applications, 2014, 1-18. https://doi.org/10.1039/9781782624523-00001.

Mura et al., Stimuli-Responsive Nanocarriers for Drug Delivery, Nature Materials, vol. 12, No. 11, 2013, 991-1003. (Abstract Only) https://www.nature.com/articles/nmat3776.

Nel et al., Understanding Biophysicochemical Interactions at the Nano-Bio Interface, Nature Materials, vol. 8, No. 7, 2009, 543-557. (Abstract Only) https://doi.org/10.1038/nmat2442.

Nishiyama et al., Current State, Achievements, and Future Prospects of Polymeric Micelles as Nanocarriers for Drug and Gene Delivery, Pharmacology & Therapeutics, vol. 112, Issue 3, 2006, 630-648. (Abstract Only) https://doi.org/10.1016/j.pharmthera.2006.05.006.

Nylander et al., Formation of Polyelectrolyte-Surfactant Complexes on Surfaces, Advances in Colloid and Interface Sciences, vols. 123-126, 2006, 105-123. (Abstract Only) https://doi.org/10.1016/i.cis.2006.07.005.

Paren et al., Percolated Ionic Aggregate Morphologies and Decoupled Ion Transport in Precise Sulfonated Polymers Synthesized by Ring-Opening Metathesis Polymerization, Macromolecules, vol. 53, No. 20, 2020, 8960-8973. https://doi.org/10.1021/acs.macromol.0c01906.

Park et al., Effects of Protein Charge Heterogeneity in Protein-Polyelectrolyte Complexation, Macromolecules, vol. 25, No. 1, 1992, 290-295. (Abstract Only) https://doi.org/10.1021/ma00027a047.

Peters et al., Nanostructured Antimony-Doped Tin Oxide Layers with Tunable Pore Architectures as Versatile Transparent Current Collectors for Biophotovoltaics, Advanced Functional Materials, vol. 26, Issue 37, 2016, 6682-6692. (Abstract Only) https://doi.org/10.1002/adfm.201602148.

Sanchez et al., Thermodynamics and Crystallization of Random Copolymers, Macromolecules, vol. 8, No. 5, 1975, 638-641. (Abstract Only) https://doi.org/10.1021/ma60047a012.

Sharma et al., Multilayer Capsules Made of Weak Polyelectrolytes: A Review on the Preparation, Functionalization an Applications in Drug Delivery, Beilstein Journal of Nanotechnology, vol. 11, 2020, 508-532. https://doi.org/10.3762/binano.11.41.

Templin et al., Organically Modified Aluminosilicate Mesostructures from Block Copolymer Phases, Science, vol. 278, No. 5344, 1997, 1795-1798. (Abstract Only) https://doi.org/10.1126/science.278.5344.1795.

Urade et al., Synthesis of Thermally Stable Highly Ordered Nanoporous Tin Oxide Thin Films with a 3D Face-Centered Orthorhombic Nanostructure, The Journal of Physical Chemistry B, vol. 109, Issue 21, 2005, 10538-10541. (Abstract Only) https://doi.org/10.1021/jp051229+.

Van Den Bergh et al., Nanostructure Dependence of T-Nb2O5 Intercalation Pseudocapacitance Probed Using Tunable Isomorphic Architectures, Advanced Functional Materials, vol. 31, Issue 1, 2021, 12 Pages. https://doi.org/10.1002/adfm.202007826.

Wang et al., Polyelectrolyte Multilayer Nanoreactors for Preparing Silver Nanoparticle Composites: Controlling Metal Concentration and Nanoparticle Size, Langmuir, vol. 18, Issue 8, 2002, 3370-3375. (Abstract Only) https://doi.org/10.1021/la015725a.

Warren et al., Ordered Mesoporous Materials from Metal Nanoparticle-Block Copolymer Self-Assembly, Science, vol. 320, Issue 5884, 2008, 1748-1752. (Abstract Only) https://doi.org/10.1126/science.1159950.

Xu et al., Interaction of Proteins with Polyelectrolytes: Comparison of Theory to Experiment, Langmuir, vol. 35, Issue 16, 2019, 5373-5391. https://doi.org/10.1021/acs.langmuir.8b01802.

Yang et al., pH-Responsive Carrier System Based on Carboxylic Acid Modified Mesoporous Silica and Polyelectrolyte for Drug Delivery, Chemistry of Materials, vol. 17, Issue 24, 2005, 5999-6003. (Abstract Only) https://doi.org/10.1021/cm051198y.

Zhao et al., Triblock Copolymer Syntheses of Mesoporous Silica with Periodic 50 to 300 Angstrom Pores, Science, vol. 279, Issue 5350, 1998, 548-552. (Abstract Only) https://doi.org/10.1126/science.279.5350.548.

Zhu et al., Metallo-Polyelectrolytes as a Class of Ionic Macromolecules for Functional Materials, Nature Communications, vol. 9, Article No. 4329, 2018, 15 Pages. https://www.nature.com/articles/s41467-018-06475-9.

\* cited by examiner

PERSISTENT MICELLE CORONA CHEMISTRY

CROSS REFERENCE TO RELATED APPLICATION

This application claims filing benefit of U.S. Provisional Application Ser. No. 63/189,381, having a filing date of May 17, 2021, which is incorporated herein by reference in its entirety.

STATEMENT REGARDING FEDERALLY SPONSORED RESEARCH OR DEVELOPMENT

This invention was made with government support under Grant No. NSF-01A-1655740, awarded by the National Science Foundation/SC EPSCoR, and Grant No. DMR-1752615, awarded by the National Science Foundation. The government has certain rights in the invention.

BACKGROUND

Micelles have been widely employed for emulsions, drug delivery, nanoreactors, and templates for diverse materials. For many such applications, the ultimate performance is influenced by the micelle aggregation number (i.e., the core dimension), the extent of functionalization, or the response of functional groups toward the environment. Thus, micelles of various dimensions are needed for different applications. For drug delivery, the micelle's size determines both the loading capacity as well as the capability to cross cell membranes. In the case of micelle templated bioelectrodes, the pore size must balance the need for surface area enhancement against the need for large enough pores to accommodate biological photoactive species. For example, high molar mass block copolymer micelles can generate about 80 nanometer macropores in antimony-doped tin oxide electrodes. With micelle size playing a key role in numerous applications, the capability to kinetically trap a desired persistent micelle size would be beneficial.

The equilibrium aggregation number for a block copolymer micelle is a balance between interfacial enthalpic contributions and entropic chain stretching contributions, along with other factors including, but not limited to, electrostatic interactions. It is understood that both the chemical composition and any functional group responses to the environment can alter the equilibrium aggregation number. Further, solvent changes can induce micelles to undergo dynamic chain exchange processes that alter the aggregation number and/or the micelle morphology to minimize the free energy of the system. Block copolymer micelles generally evolve through single chain exchange, micelle fusion/fission, or a combination of these processes. The rate of exchange varies significantly with the thermodynamic barrier for rearrangement. For single-chain exchange, there is a double exponential rate dependence on $\chi N$, where $\chi$ is the high Flory-Huggins effective interaction parameter between the solvent and the core block and N scales with the degree of polymerization. Such chain exchange processes can also be kinetically trapped using high-$\chi N$ conditions. With these considerations, a large thermodynamic activation energy for single-chain exchange may impose kinetic control.

As such, a need exists for a method for kinetic control of micelles during chemical modifications. Such methods would allow for chemical modifications of the corona of kinetically trapped "persistent" polymer micelles.

SUMMARY

Objects and advantages of the invention will be set forth in part in the following description, or may be obvious from the description, or may be learned through practice of the invention.

In one embodiment, a method of forming persistent micelles is disclosed. The method includes dissolving a block copolymer in a first solvent to form a dispersion containing unimers or dynamic micelles and then contacting the dispersion with a second selective solvent.

In one embodiment, the persistent micelles' diameter remains constant while independently tailoring Coulombic interaction strength of the persistent micelles.

In one embodiment, functional group density of the persistent micelles is independently adjusted.

In one embodiment, the block copolymer comprises a core block and a corona block.

In one embodiment, the block copolymer has a molar mass between about 20 kg/mol and about 100 kg/mol.

In one embodiment, the core block comprises a methacrylate derivative and/or the corona block comprises a polyether.

In one embodiment, the block copolymer comprises poly(cyclohexyl methacrylate-b-(diethoxyphosphoryl)methyl methacrylate).

In one embodiment, the first solvent is a non-selective solvent, and the non-selective solvent is able to disperse both the core and the corona blocks.

In one embodiment, the first solvent comprises tetrahydrofuran (THF), methylene chloride, chloroform, or a combination thereof.

In one embodiment, the second solvent comprises, acetonitrile, methanol, ethanol water, or a combination thereof.

In one embodiment, the first solvent was removed by evaporation to yield persistent micelles with immobilized core blocks.

In one embodiment, a reagent contacts the dispersion comprising bromotrimethylsilane (TMSBr), methanol, water, or a combination thereof.

In one embodiment, the functionalized persistent micelles comprise a zeta potential from about 0 mV to −15 mV.

In one embodiment, the functionalized persistent micelles further comprise a mono acid, a di-acid, or a combination thereof.

In one embodiment, the average core diameter of the persistent micelles ranges from about 10 nm to about 200 nm.

In one embodiment, a block copolymer for use with forming persistent micelles is provided comprising: a core block and a corona block.

Other features and aspects of the present invention are discussed in greater detail below.

BRIEF DESCRIPTION OF THE FIGURES

A full and enabling disclosure of the present invention, including the best mode thereof to one skilled in the art, is set forth more particularly in the remainder of the specification, which includes reference to the accompanying figures, in which.

Figure 1:
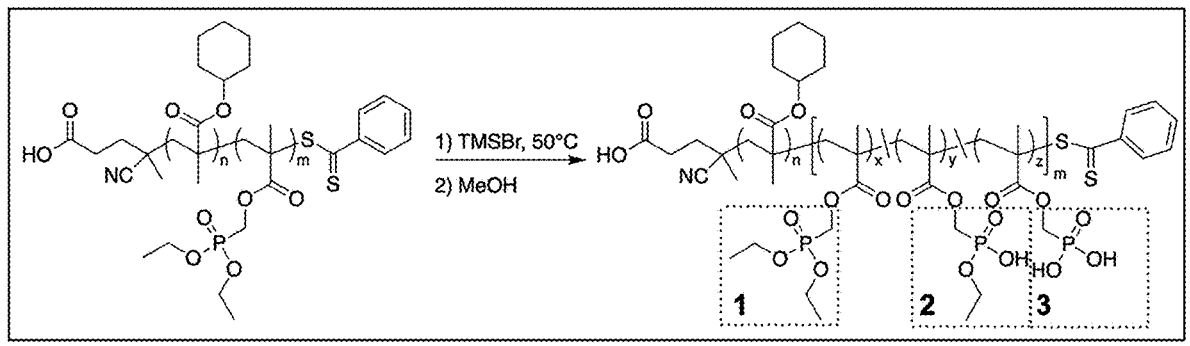
FIG. 1 is a schematic for one embodiment of hydrolysis of PCHMA-b-PDEPMMA in acetonitrile using bromotrimethylsilane (TMSBr) followed by solvolysis in methanol. The resulting modified PDEPMMA block contains a random distribution of di-ester (1), mono-acid (2), and di-acid (3) phosphorous functional groups depending on the extent of reaction.

Repeat use of reference characters in the present specification and figures is intended to represent the same or analogous features or elements of the present invention.

DETAILED DESCRIPTION

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only and is not intended as limiting the broader aspects of the present invention, which broader aspects are embodied exemplary constructions.

Generally, the size (e.g., average core diameter) and chemical functionalization of a micelle determines how it may perform in various applications. As such, micelle parameters (e.g., size, chemical functionalization, etc.) are fundamentally coupled since the equilibrium size of a micelle is a function of the chemical composition, among other parameters. The ability to independently control micelle core size, functional group content and the response to stimuli are of interest for a range of applications, including polyelectrolyte applications. However, independently controlling various parameters of a micelle is very difficult, often due to reliance upon equilibrium-based processing. For instance, micelles with active chain exchange mechanisms are able to change their aggregation number in response to either functionalization or changes in external stimuli. Furthermore, the formation of kinetically-trapped micelles after functionalization also leads to different sizes depending on the extent of functionalization. In order to address this challenge, the present disclosure is directed to functionalization of kinetically-trapped block copolymer micelles while maintaining a constant core size. Surprisingly, by initially establishing a specific aggregation number, subsequently enabled persistency can be preserved throughout chemical functionalization and/or external stimuli.

In one embodiment, a method of forming a persistent micelle corona as contemplated by the present disclosure comprises dissolving a block copolymer in a first solvent to form a dispersion containing unimers or dynamic micelles and contacting the dispersion with a second solvent. Removal of the first solvent from the block copolymer solution via evaporation results in the formation of persistent micelles with immobilized core blocks, wherein exchange of polymer chains of the block copolymer between micelles is hindered leading to kinetic entrapment of persistent micelle core blocks. In one embodiment, kinetic entrapment is maintained by a large thermodynamic barrier to polymers entering the solution phase via the use of selective solvents. In another embodiment kinetic entrapment is maintained by use of a glassy core block in addition to the careful avoidance of plasticizing molecules. In another embodiment, kinetic entrapment is maintained by crosslinking the polymer molecules. In some embodiments, the chemistry of the micelle corona blocks are chemically or physically modified. Further, contacting the persistent micelles with a reagent can be carried out, resulting in functionalization. For instance, maintaining a diameter of the persistent micelles while independently adjusting functional group density of the persistent micelles can be carried out. In another instance, maintaining a diameter of the persistent micelles while independently tailoring Coulombic interaction strength of the persistent micelles can also be carried out.

Any suitable polymer may be used as the base polymer for forming the persistent micelles. In one embodiment, the polymer may be a block copolymer that may comprise a core block and a corona block. For instance, the polymer may comprise a core block, a corona block, or a combination thereof. According to one embodiment, the core block may comprise high-$\chi N$ conditions, glassy core micelles, crystalline core micelles, or crosslinked core micelles. "$\chi$" is defined as the effective interaction parameter between the core block and the solvent. "N" scales with the degree of polymerization. According to one embodiment, the core block comprises a cyclohexyl methacrylate and the corona block comprises a polyether (e.g., polyphosphonated ester). By way of example, the block copolymer may comprise, without limitation, poly(cyclohexyl methacrylate-b-(diethoxyphosphoryl)methyl methacrylate).

A block copolymer may have a molar mass ranging from about 20 kg/mol to 100 kg/mol, such as from about 20 kg/mol to about 25 kg/mol, such as from about 25 kg/mol to about 30 kg/mol, such as from about 30 kg/mol to about 35 kg/mol, such as from about 35 kg/mol to about 40 kg/mol, such as from about 45 kg/mol to about 50 kg/mol, such as from about 50 kg/mol to about 55 kg/mol, such as from about 55 kg/mol to about 60 kg/mol, such as from about 60 kg/mol to about 65 kg/mol, such as from about 65 kg/mol to about 70 kg/mol, such as from about 70 kg/mol to about 75 kg/mol, such as from about 75 kg/mol to about 80 kg/mol, such as from about 80 kg/mol to about 85 kg/mol, such as from about 85 kg/mol to about 90 kg/mol, such as from about 90 kg/mol to about 95 kg/mol, such as from about 95 kg/mol to about 100 kg/mol, or any range therebetween.

Regardless of the particular polymers used to form the persistent micelles according to the method contemplated by the present disclosure, the solution from which the persistent micelles are formed may comprise a first solvent and a second solvent, wherein the second solvent can be a selective solvent that induces micellization and kinetic entrapment. The first solvent may be a non-selective solvent such as tetrahydrofuran (THF), methylene chloride, chloroform, or a combination thereof. The second solvent may be a selective solvent such as water or any other liquid (e.g., alcohols, acetonitrile) that is a selective solvent for the corona block of the block copolymer.

To form a mixture of a first solvent and a second (selective) solvent, the selective solvent can be slowly added to the solution. In general, the selective solvent can be added to the solution in an amount ranging from about 1 vol. % to about 100 vol. %, such as from about 1.5 vol. % to about 50 vol. %, such as from about 2 vol. % to about 20 vol. %, such as from about 2.5 vol. % to about 10 vol. %, such as from about 15 vol. % to about 30 vol. %.

The second solvent may, without limitation, comprise acetonitrile, methanol, ethanol water, or a combination thereof. In one embodiment, removal of the first solvent from the block copolymer solution in the presence of the second solvent may induce kinetic entrapment of the micelles through immobilization of the core block.

According to one embodiment, the core block comprises a glassy PCHMA core block wherein its glass transition temperature is higher than the processing temperature, thus limiting molecular mobility. The first solvent may be removed by evaporation (e.g., rotary evaporation) or any appropriate removal method.

A persistent micelle corona of the formed persistent block copolymer micelle may be independently functionalized, such as by adjusting functional group density or tailoring Coulombic interaction strength of the persistent micelles. For example, the block polymer may be functionalized via the use of a monomer with a pendant phosphonated ester that may be hydrolyzed to yield one or more phosphonic acid groups. The formed functional group may be responsive to pH changes, thus tailoring the persistent micelle corona Coulombic strength.

In one embodiment, a functional group of the functionalized block copolymer may have a Coulombic response to pH changes. In one embodiment, the functional group may comprise pKa values from about 2 to about 12, such as a pKa value from about 2 to about 2.5, such as a pKa value from about 2.5 to about 2.75, such as a pKa value from about 2.75 to about 3, such as a pKa value from about 3 to about 4, such as a pKa value from about 4 to about 5, such as a pKa value from about 5 to about 6, such as a pKa value from about 6 to about 7, such as a pKa value from about 7 to about 8, such as a pKa value from about 8 to about 8.2, such as a pKa value from about 8.2 to about 9, such as a pKa value from about 9 to about 10, such as a pKa value from about 11 to about 12, or any range therebetween.

In one embodiment, a reagent can be added to the block copolymer solution following formation of the persistent micelles. The reagent can be selected from a group comprising bromotrimethylsilane (TMSBr), methanol, water, or a combination thereof. Subsequently, the reagent can induce hydrolysis of a functional group (e.g., pendant phosphonate group, alkyl ester, etc.) of the corona block. For example, according to one embodiment, the reagent may comprise TMSBr, which can transform an alkyl ester of a block copolymer into trimethylsilyl ester. Further, the formed trimethylsilyl ester may then undergo solvolysis to form a phosphonic acid group. According to one embodiment, the amount of TMSBr added can directly correspond to the amount of ester hydrolysis, which can range from about 0 mol. % to 99 mol. %, such as from about 0 mol. % to about 7 mol. %, such as from about 7 mol. % to about 18 mol. %, such as from about 18 mol. % to about 30 mol. %, such as from about 30 mol. % to about 40 mol. %, such as from about 40 mol. % to about 45 mol. %, such as from about 45 mol. % to about 60 mol. %, such as from about 60 mol. % to about 70 mol. %, such as from about 70 mol. % to about 80 mol. %, such as from about 80 mol. % to about 90 mol. %, such as from about 90 mol. % to about 95 mol. %, such as from about 95 mol. % to about 99 mol. %, or any range therebetween.

According to one embodiment, the functionalized persistent micelle corona can be further modified to include one or more additional functionalities, such as, without limitation, a mono acid, a di-acid, or a combination thereof.

In one embodiment, corona functionalization may be utilized to provide a desired zeta (ζ) potential, wherein an increase in the degree of hydrolysis results in a decreasing ζ potential. It is noted that ζ potential is consistent with an increase in anionic charge via the formation of phosphonic acid groups. Thus, a formed block copolymer in which functional groups may be tailored and functionalized to any extent with up to 100% precision.

EXAMPLES

Materials and Methods

Materials herein were used as received unless specified otherwise. Diethyl (hydroxymethyl)phosphonate (≥97.0%, TCI), methacrylic acid (99+%, Alfa Aesar), N'N-dicyclohexylcarbodiim ide (DCC, ≥99%, BeanTown Chemical), 4-cyano-4-(phenylcarbonothioylthio)pentanoic acid (4CPDB, 97% Strem Chemicals), sodium hydroxide (≥97%, Sigma), chloroform (≥99.8%, VWR), tetrahydrofuran (Fisher), methylene chloride (Fisher), acetonitrile (≥99.9%, Sigma), and 4-dimethylaminopyridine (DMAP, 99+%, TCI) were used as received. Cyclohexyl methacrylate (98.0%, TCI) monomer was run over a basic alumina column prior to use. 2,2'-Azobis(2-methylpropionitrile) (AIBN, Sigma) was recrystallized from methanol. Bromo-trimethylsilane (TMSBr, 97%, Chem Impex Intl Inc MS) was stored in the glovebox. Methanol (99.8%, Fisher) was dried at room temperature by storage over 30% w/v of molecular sieves (3A, 8-12 mesh, Acros Organics™).

Monomer Synthesis of (Diethoxyphosphoryl)Methyl Methacrylate (DEPMMA)

Figure 8:
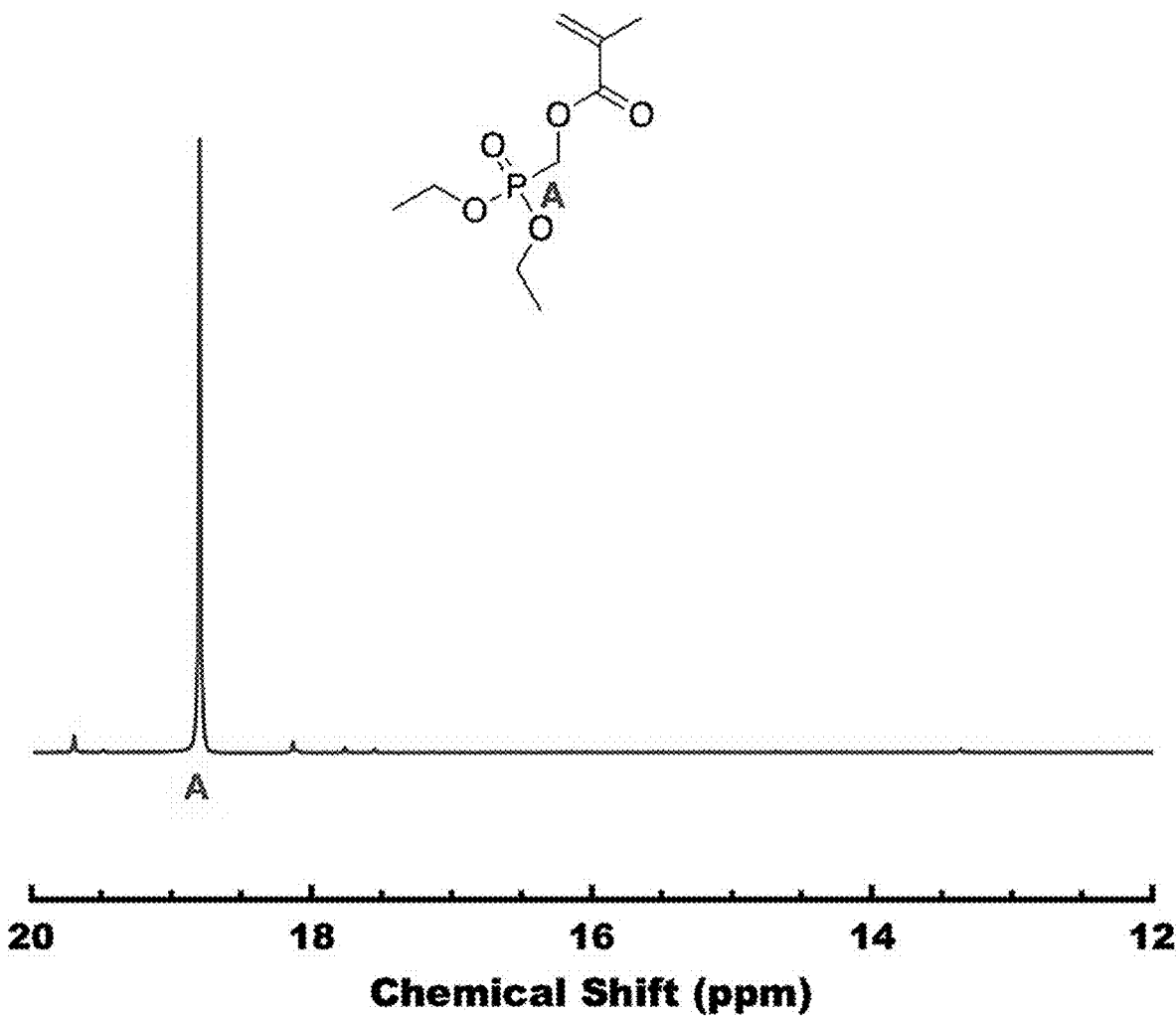
FIG. 8 presents $^{31}$P-NMR data for (diethoxyphosphoryl) methyl methacrylate synthesized via Steglich esterification with methacrylic acid. The NMR solvent is $CDCl_3$.
Figure 9:
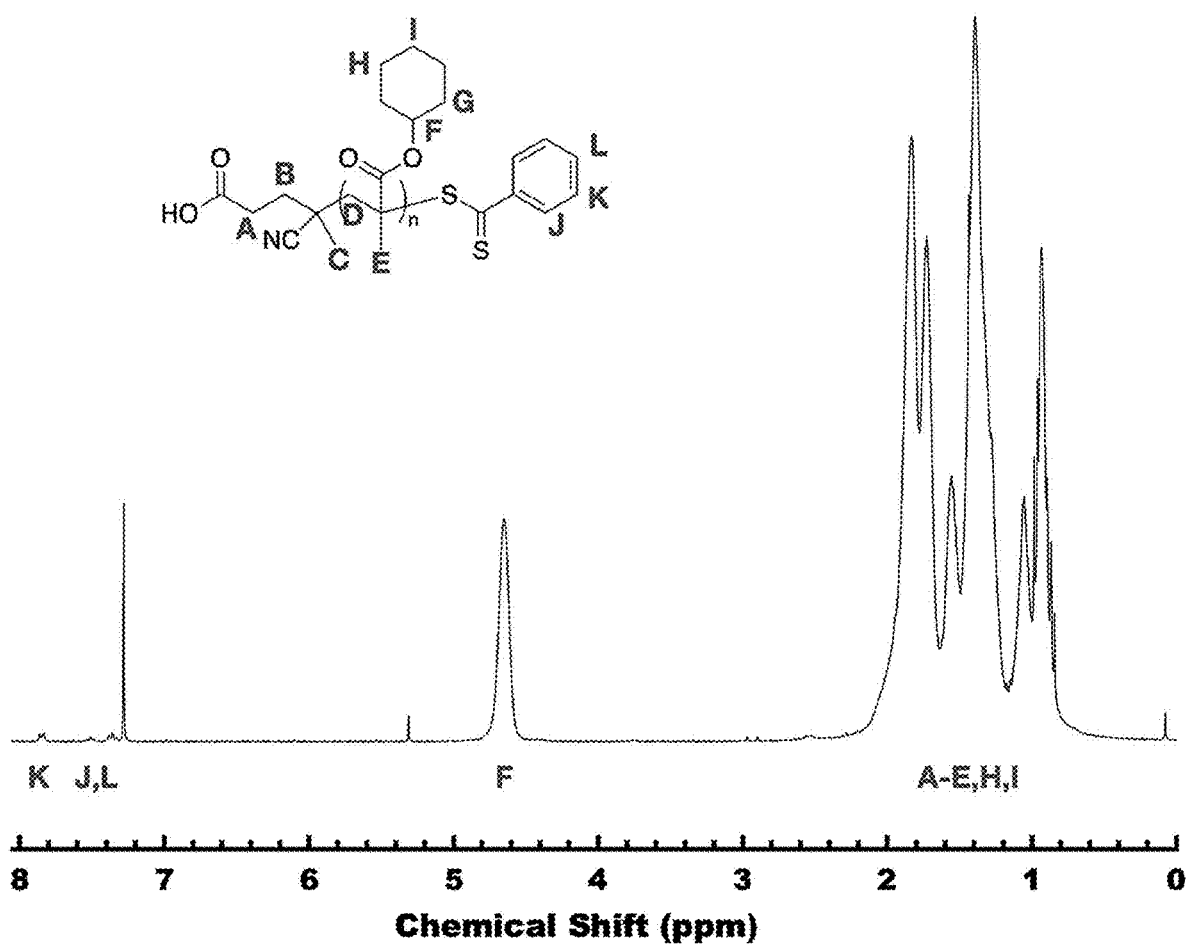
FIG. 9 presents $^1$H-NMR data for poly(cyclohexyl methacrylate) polymerized via RAFT using 4CPDB. The NMR solvent is $CDCl_3$.
Figure 10:
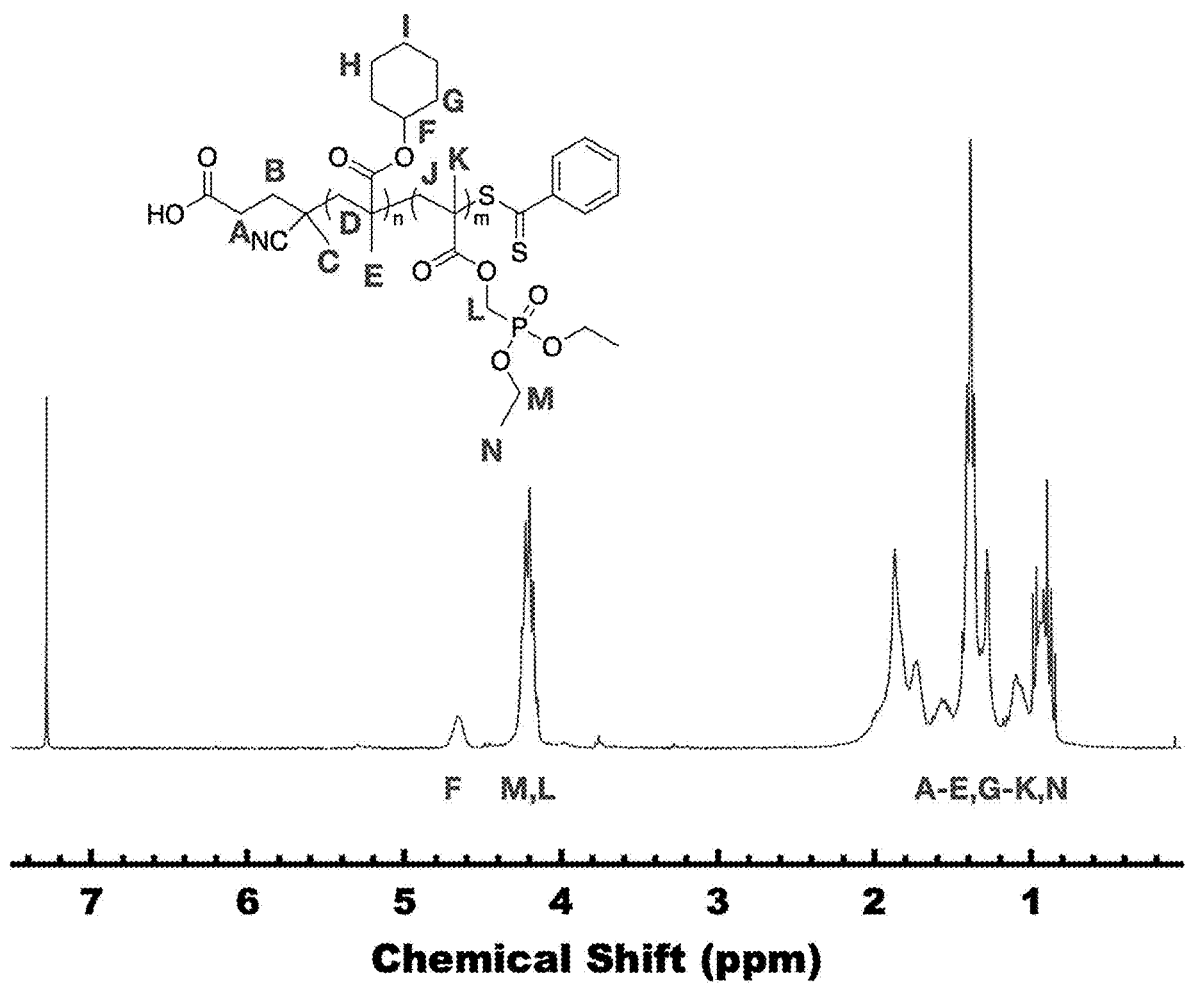
FIG. 10 presents $^1$H-NMR data for PCHMA-b-PDEPMMA synthesized via RAFT with PCHMA-4CPDB as the macro-initiator. The NMR solvent is $CDCl_3$.

Diethyl (hydroxymethyl)phosphonate (5 g, 4.27 mL, 29.73 mmol), methacrylic acid (2.56 g, 29.73 mmol), and 15 mL of chloroform were mixed in a round bottom flask. The solution was cooled to 0° C. and sparged with nitrogen for 30 minutes. A solution of N'N-dicyclohexylcarbodiimide (DCC) (6.75 g, 32.70 mmol), 4-dimethylaminopyridine (DMAP) (0.40 g, 3.27 mmol), and 5 mL of chloroform was then added in a dropwise manner. The suspension was left to vigorously stir at room temperature for 2 hours. The suspension was then filtered, and the chloroform was removed using reduced pressure. The final product (diethoxyphosphoryl)methyl methacrylate (DEPEMA) was verified using $^1$H-NMR and $^{31}$P-NMR (FIG. 8; FIG. 10).

Synthesis of Poly(Cyclohexyl Methacrylate) (PCHMA)

Figure 7:
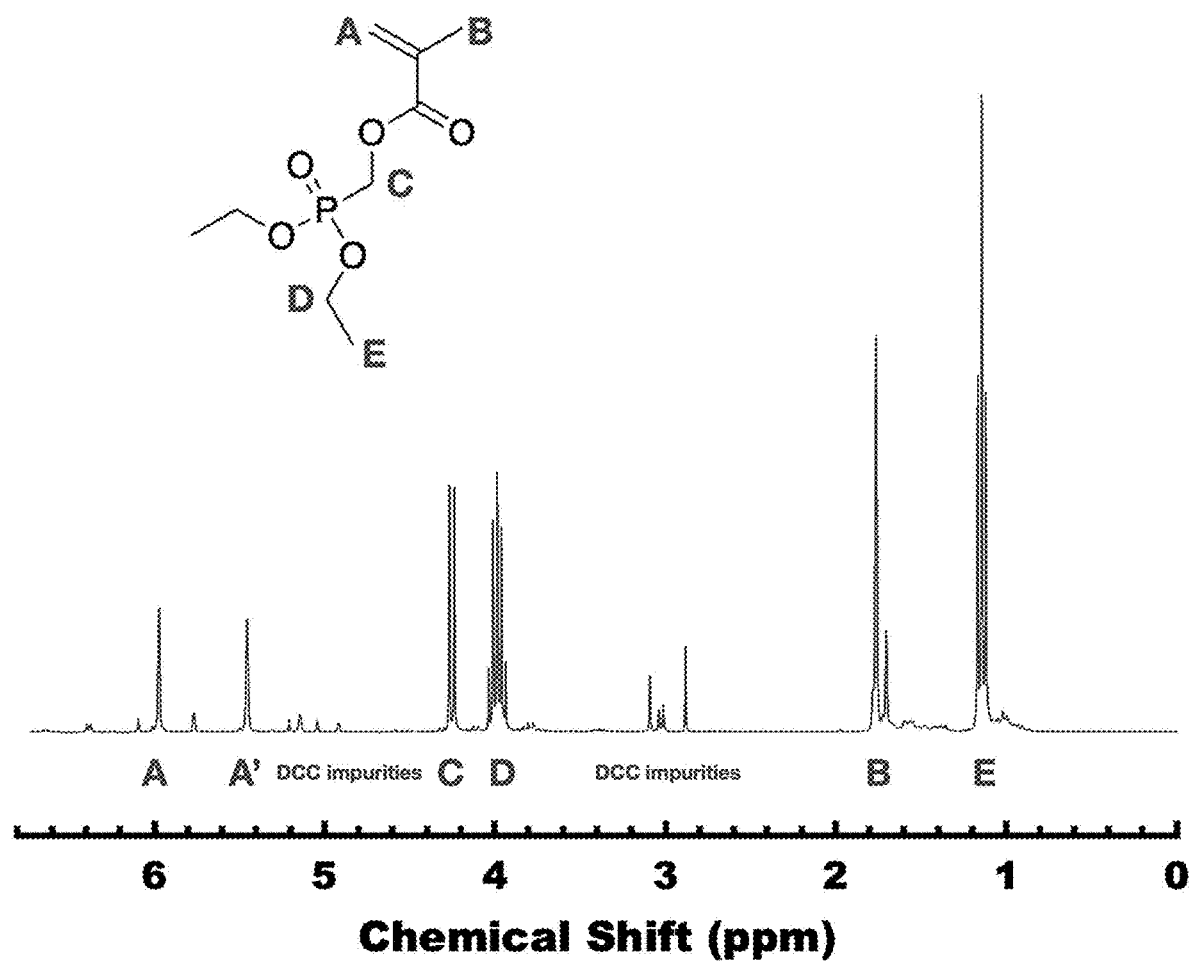
FIG. 7 presents $^1$H-NMR data for (diethoxyphosphoryl) methyl methacrylate monomer with trace DCC contaminants present. The NMR solvent is $CDCl_3$.

Cyclohexyl methacrylate (CHMA) (7.50 mL, 42.95 mmol), 2,2'-Azobis(2-methylpropionitrile) (AIBN) (8.80 mg, 0.054 mmol), 4-cyano-4-(phenylcarbonothioylthio)pentanoic acid (4CPDB) (100 mg, 0.36 mmol), and 4.50 mL of tetrahydrofuran (THF) were combined in a Schlenk flask and subjected to three cycles of freeze-pump-thaw. The reaction flask was then brought into an argon-filled glovebox in order to backfill the flask with argon. The polymerization was then carried out in a preheated oil bath at 70° C. for 16.75 hours. Once the polymerization was complete, the reaction was cooled in a freezer before venting and dilution with THF to fully dissolve the viscous product. PCHMA was then precipitated using cold methanol and was dried in a vacuum oven overnight. The molar mass of PCHMA was calculated based on the ratio of RAFT agent to cyclohexyl methacrylate, assuming 100% conversion. The molar mass and conversion were quantified using $^1$H-NMR in CDCl$_3$ (FIG. 7). The molar-mass dispersity (Ð) was verified by GPC.

PCHMA-b-PDEPMMA Diblock Polymer Synthesis

Figure 11:
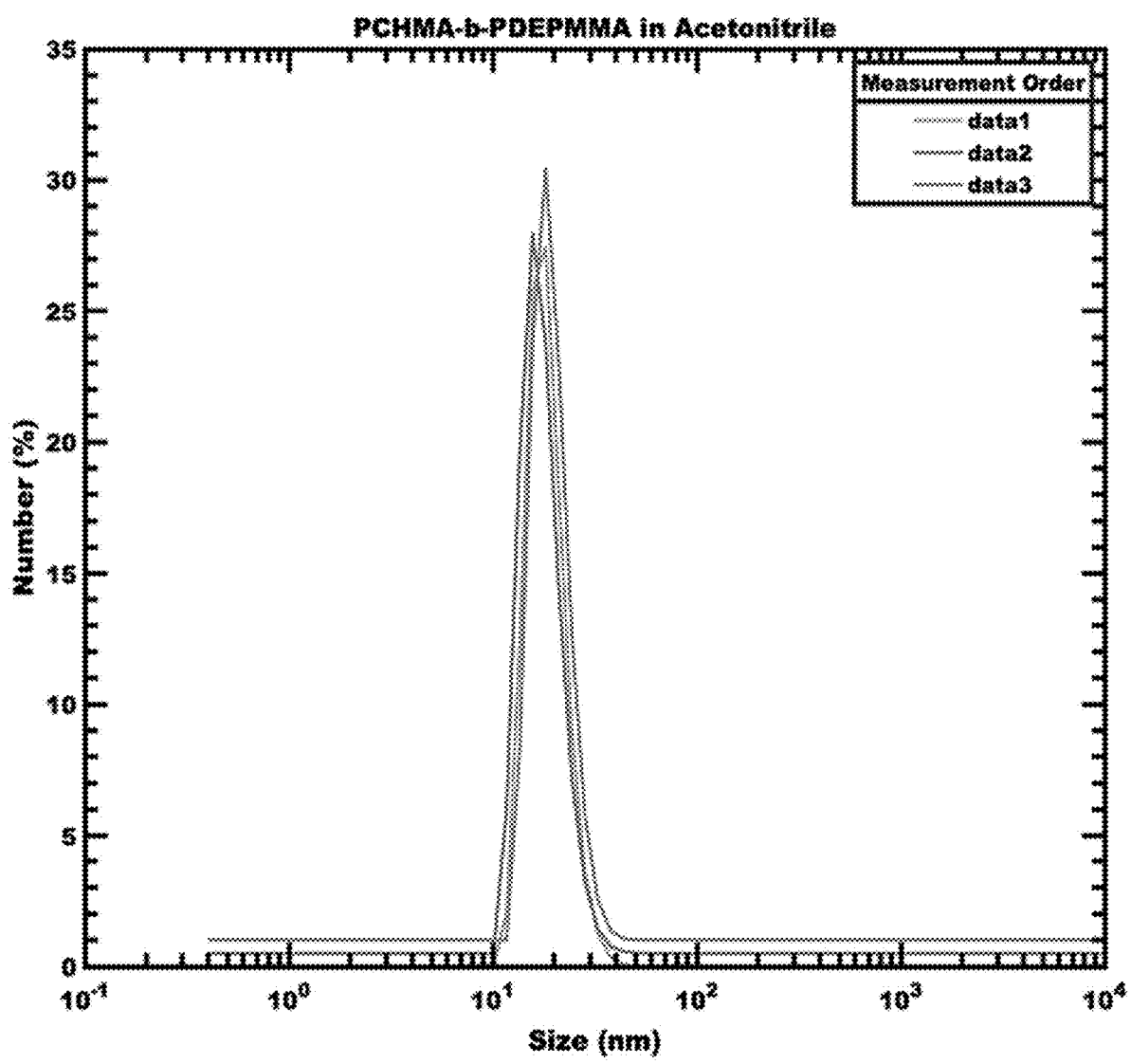
FIG. 11 presents DLS data for PCHMA-b-PDEPMMA micelles dispersed in acetonitrile.
Figure 12:
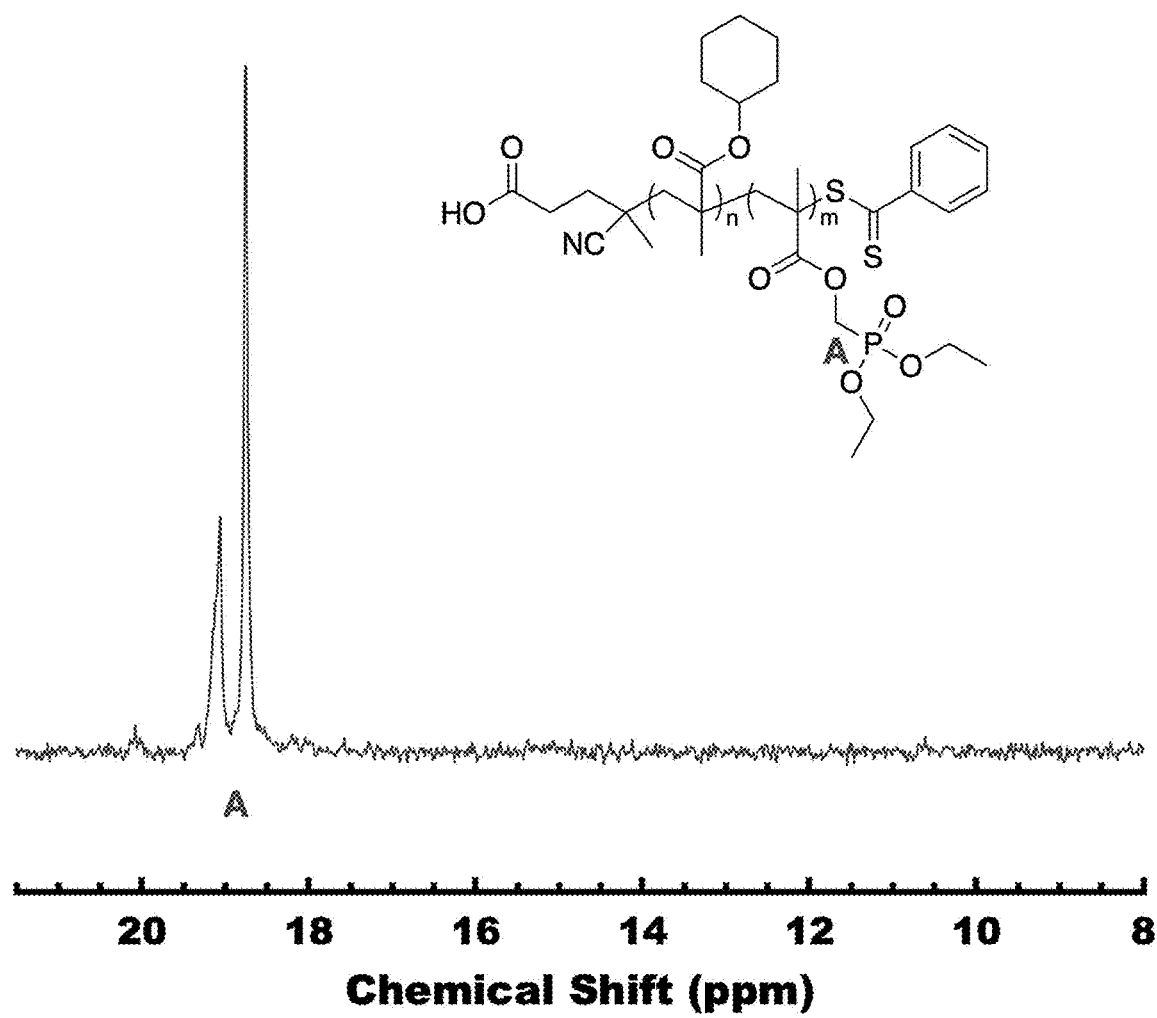
FIG. 12 presents $^{31}$P-NMR data for PCHMA-b-PDEPMMA synthesized via RAFT with PCHMA-4CPDB as the macro-initiator. The NMR solvent is $CDCl_3$.

PCHMA-4CPDB (20k) macro-initiator (3.50 g, 0.17 mmol), 2,2'-Azobis(2-methylpropionitrile) (AIBN) (8.54 mg, 0.052 mmol), DEPMMA (6.14 g, 6.54 mL, 26.01 mmol), and 6.85 mL of THF were mixed in a Schlenk flask and subjected to three cycles of freeze-pump-thaw. The reaction flask was then brought into an argon-filled glovebox in order to backfill the flask with argon. The polymerization was then carried out in a preheated oil bath at 70° C. for 18.25 hours. The reaction was then cooled in a freezer before venting and dilution with THF to fully dissolve the viscous product. PCHMA-b-PDEPMMA was then precipitated out using cold hexane and dried in a vacuum oven overnight. The molar mass and conversion were quantified using $^1$H-NMR in CDCl$_3$ (FIG. 11). The molar mass dispersity (Ð) was verified by GPC as shown below in Table 1.

TABLE 1

| Polymer | Mn (g/mol) | Wt % CHMA | Wt % DEPMMA | Ð |
|---|---|---|---|---|
| PCHMA-b-PDEPMMA | 52,000 | 38.9% | 61.1% | 1.12 |

Glassy Core Micelle Stock Preparation

Figure 13:
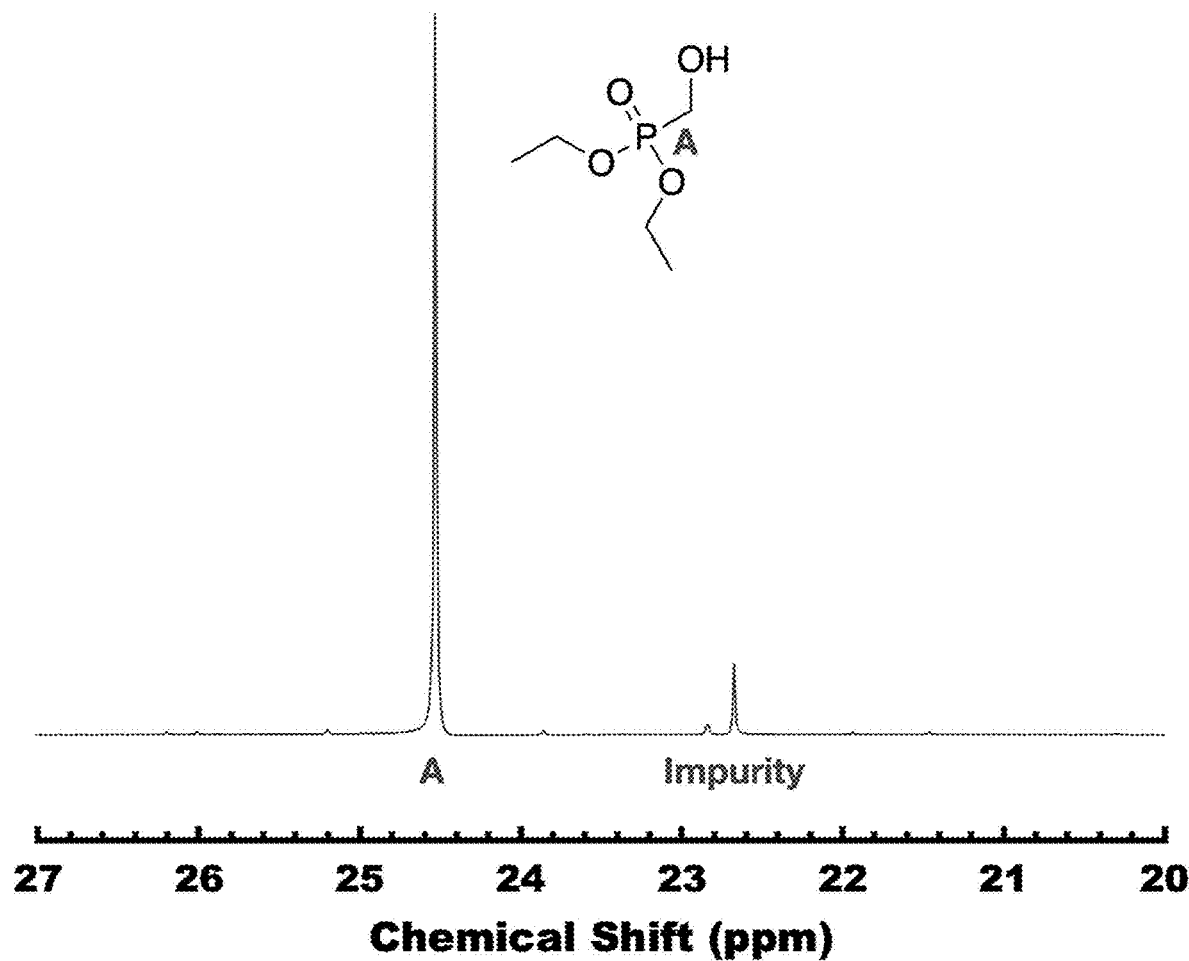
FIG. 13 presents $^{31}$P-NMR data for diethyl(hydroxymethyl)phosphonate dissolved in $CDCl_3$.

PCHMA-b-PDEPMMA (52k) (1 g, 0.2 mmol) was dissolved in 100 mL of methylene chloride. Then, 240 mL of acetonitrile was added dropwise to the stirring solution to induce micelle formation as checked by DLS (FIG. 13). Methylene chloride and excess acetonitrile was removed by rotary evaporation until the concentration of the solution was 10 mg/m L. This micelle stock solution was subjected to three cycles of freeze-pump-thaw and was stored in an argon-filled glovebox.

Micellized-then-Hydrolyzed Method (MH)

What followed was a generalized deprotection procedure. In a glovebox, 5 mL of the micelle stock solution was placed in a vial with a stir bar. An equivalent amount of bromotrimethylsilane (TMSBr) dependent on the desired extent of hydrolysis was added to the vial before it was sealed. TMSBr was labeled as 97% purity; however, repeated hydrolysis reactions consistently resulted in 95% conversion, and thus, 95% TMSBr purity was assumed for all stoichiometric calculations. The solution was stirred in a preheated oil bath at 50° C. overnight. The suspension was then dried and redispersed in 5 mL of methanol and allowed to stir for 2 hours. A small aliquot of the solution was dried and mixed in a solution of 60:40 MeOD:CDCl$_3$ with a drop of deuterium chloride added in order to protonate all phosphonic acid groups present to verify the extent of deprotection with $^{31}$P-NMR. A model assuming random hydrolysis was compared to this data. The goodness-of-fit for the model, $R^2$, was calculated as the sum squared of regression divided by the sum square of the total.

Micelle Solvent Exchange

Micelles that were previously functionalized via deprotection were transferred from methanol to a different solvent. Aqueous sodium hydroxide (1 mM, 3 mL) was added dropwise to 2 mL of 10 mg/mL functionalized micelle stock solution. Subsequently, the methanol was removed by rotary evaporation.

Hydrolyzed-then-Micellized Method (HM)

A functionalized micelle stock was dried and redispersed as unimers in 2 mL of THF (relatively non-selective) to remove effects of the prior processing history. Next, an aqueous sodium hydroxide solution (1 mM, 3 mL) was added dropwise to the stirring micelle solution in order to form micelles. The THF was subsequently removed by rotary evaporation.

DLS Measurements

Aliquots of 2 mL were filtered through 0.2 mm syringe filters into quartz cuvettes and were tightly sealed. Measurements were performed using a Zetasizer® Nano ZS90 ZEN3690 instrument. Measurements were run at 25° C. with 5-minute thermal equilibration time prior to each 5-minute acquisition. The data for micelle size were analyzed using the refractive index of pure MeOH or pure acetonitrile since the solutions were ~99% pure solvent. Data were fit with a log-normal distribution corresponding to the mean and standard deviation.

TEM Measurements

TEM images were acquired using a JEOL™ JEM-1400 Plus TEM operated in bright field mode with an accelerating voltage of 120 kV. Samples were prepared by placing a single drop of 10 mg/mL micelle solution onto a carbon-coated 300 mesh copper grid purchased from Electron Microscopy Sciences. The solvent was wicked away after 2 minutes with filter paper. Samples were then stained by placing one drop of 1% uranyl acetate solution onto each grid for 3 minutes before wicking the solvent away with filter paper. About 60 measurements were taken from each sample condition to yield statistically relevant metrics for the average, the standard deviation (statistical spread), and the standard error of the mean (uncertainty of the mean value itself).

Results and Discussion

A custom corona block was prepared to enable desired functionalization. Specifically, (diethoxyphosphoryl)methyl methacrylate (DEPMMA) was chosen due to the well-studied characteristics of this class of polymers and the ease of hydrolysis post-polymerization for the phosphonated esters to become acid groups via the McKenna reaction. These phosphonic acid moieties have pKa values of 2.75 and 8.2, allowing for the tailoring of Coulombic interactions in response to pH changes. For the present example, a methacrylate corona block was preferred for facile reversible addition-fragmentation chain-transfer (RAFT) polymerization. The DEPMMA monomer synthesis used a Steglich esterification similar to a prior report. The $^1$H-NMR confirmed successful synthesis of DEPMMA albeit with some excess DCC (FIG. 8) that was benign towards subsequent polymerization and removed later during polymer purification. The solubility of the corona block is also crucial to consider. Here, PDEPMMA is soluble in e.g., alcohols, THF, chloroform, methylene chloride, and acetonitrile, whereas after hydrolysis the resulting poly[((methacryloyloxy)methyl) phosphonic acid] is soluble in THF, acetonitrile, water and alcohols, but not chloroform nor methylene chloride. This solubility requirement is important such that the micelles remain dispersed throughout the functionalization process. This requirement narrows the list of candidate solvents down to water, alcohols, THF, or acetonitrile. The solvent selection is further constrained by compatibility with the desired reaction(s). Here, the hydrolysis of PDEPMMA is planned via the McKenna reaction, which is incompatible with protic solvents, leaving THF and acetonitrile on the list of candidate solvents.

A core block was also carefully selected to demonstrate the PMCC concept. The main role of the core block was to maintain kinetic control of the micelle size and aggregation number. A glassy block was selected for molecular immobilization so long as plasticizing solvents are avoided. At this point, the list of candidate solvents include THF and acetonitrile. Though limiting, the use of known solubility databases 64 and creative polymer chemistry can often yield suitable combinations. For example, early attempts with poly(methyl methacrylate) (PMMA) and poly-styrene (PS) core blocks both failed due to plasticization by THF and acetonitrile. Using available databases, a search for methacrylate's that were more hydrophobic than PS and PMMA to avoid plasticization by acetonitrile while having a glass transition temperature (Tg) above all reaction conditions yielded cyclohexyl methacrylate (CHMA). Please note that this sequence of considerations is not exhaustive, but rather, is intended to be illustrative of the confluence of factors. Lastly, PCHMA is also compatible with our chosen RAFT polymerization method. The CHMA polymerization was allowed to progress until >99% conversion as validated by $^1$H-NMR (FIG. 7). The PCHMA was measured using GPC and was found to have a molar mass dispersity index of 1.08. Subsequently, the PCHMA-4CPDB macroinitiator was used for DEPMMA polymerization to yield PCHMA-b-PDEPMMA. The polymerization was allowed to progress to 88% conversion as tracked by $^1$H-NMR. The final polymer had a molar mass of 52 kg/mol, a composition of 61 wt. % PDEPMMA, and a molar mass dispersity index of 1.12 (Table 1). Please note that the final PCHMA-b-PDEPMMA is amphiphilic and readily forms micelles with selective solvents (FIG. 13). Thus, a custom block copolymer was prepared for subsequent investigation of the hydrolysis and micellization sequence.

Functionalization Via Hydrolysis of Pendant Phosphonate Groups

Figure 2A:
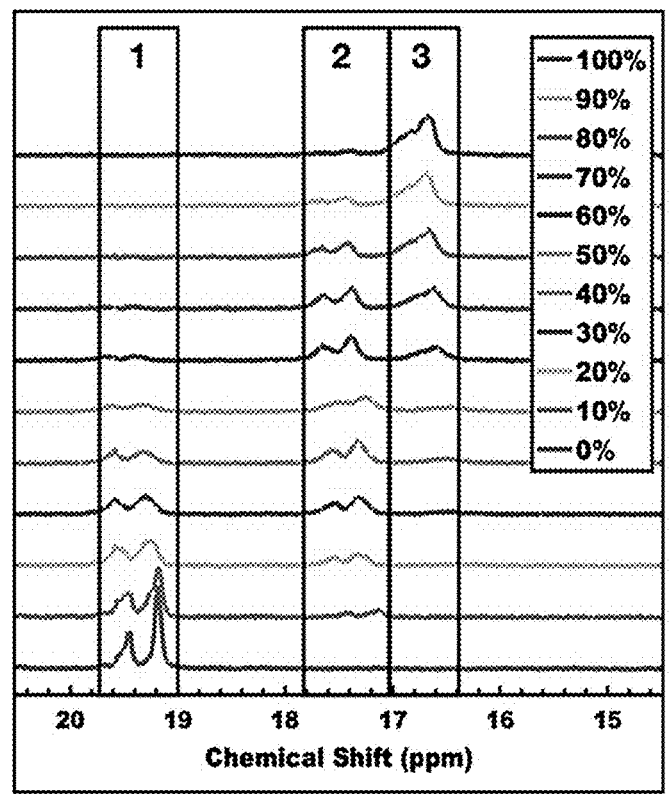
FIG. 2A presents hydrolysis of PDEPMMA di-ester (1) to the mono-acid (2) and di-acid (3) products.
Figure 2B:
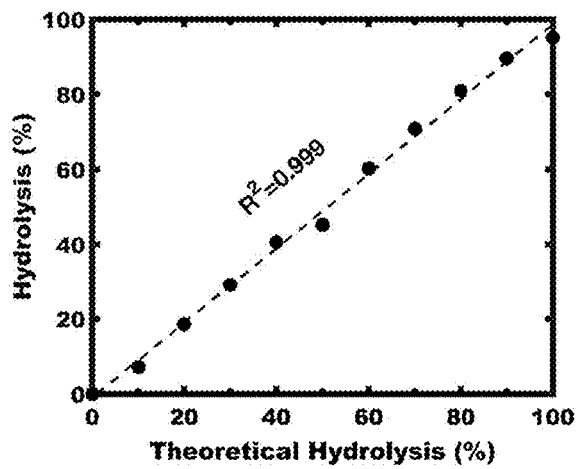
FIG. 2B presents hydrolysis reaction efficiency of PCHMA-b-PDEPMMA (TMSBr 95% purity, $R^2$ is the Pearson correlation coefficient).
Figure 2C:
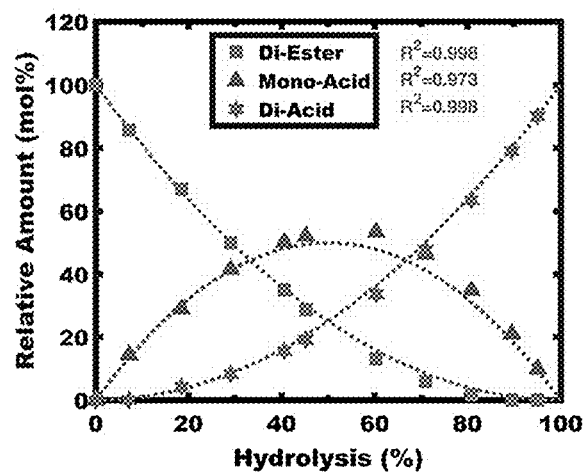
FIG. 2C presents corresponding distributions of di-ester (1), mono-acid (2), and di-acid (3) phosphorous functional groups. The dashed lines were calculated based upon equal reactivity (random probability) of di-ester and mono-acid.

Hydrolysis of PDEPMMA was next investigated with the aim of granular functionalization to enable tailoring of the acid content and the associated Coulombic interactions. The Mckenna reaction was selected for hydrolysis where TMSBr is added to transform the alkyl ester into the corresponding trimethylsilyl ester. Subsequently, methanol was added to induce solvolysis, forming the desired phosphonic acid group (FIG. 1). A range of TMSBr/phosphonate ratios were examined and the extent of hydrolysis was measured using $^{31}$P-NMR (FIG. 2A). The degree of hydrolysis was found to be quantitative where the amount of TMSBr directly corresponded to the extent of ester hydrolysis ranging from 0 mol. %-95.05 mol. % (Table 1) with a Pearson correlation coefficient of 0.999 (FIG. 2B). Each mer of PDEPMMA has a single pendant phosphonate group with two esters that are each available for hydrolysis. Thus, the possible hydrolysis products include both a mono-acid and a di-acid (FIG. 1). These specific hydrolysis products were quantified using $^{31}$P-NMR, where there was clear separation between di-ester, mono-acid, and di-acid groups (FIG. 2A). The peaks at 19.5 ppm, 17.5 ppm and 16.5 ppm correspond to the di-ester phosphonate (FIGS. 2A, 1), the mono-acid phosphonate (FIG. 2A), and the di-acid phosphonate (FIGS. 2A, 3), respectively. The trends of hydrolysis product distribution as a function of TMSBr content are presented in FIG. 2C. For example, there was a steady increase in mono-acid content until reaching 60% total hydrolysis, at which point the mono-acid content steadily decreased due to its conversion to the di-acid. The measured functional group compositions well-matched the theoretical expectations for random and unbiased hydrolysis with goodness-of-fit values exceeding 0.97 (FIG. 2C—dashed lines). Thus, a block polymer with a tailored and granular functionalization of pendant phosphonate groups was demonstrated.

Micelle Formation Pathway Dependence

Figure 3:
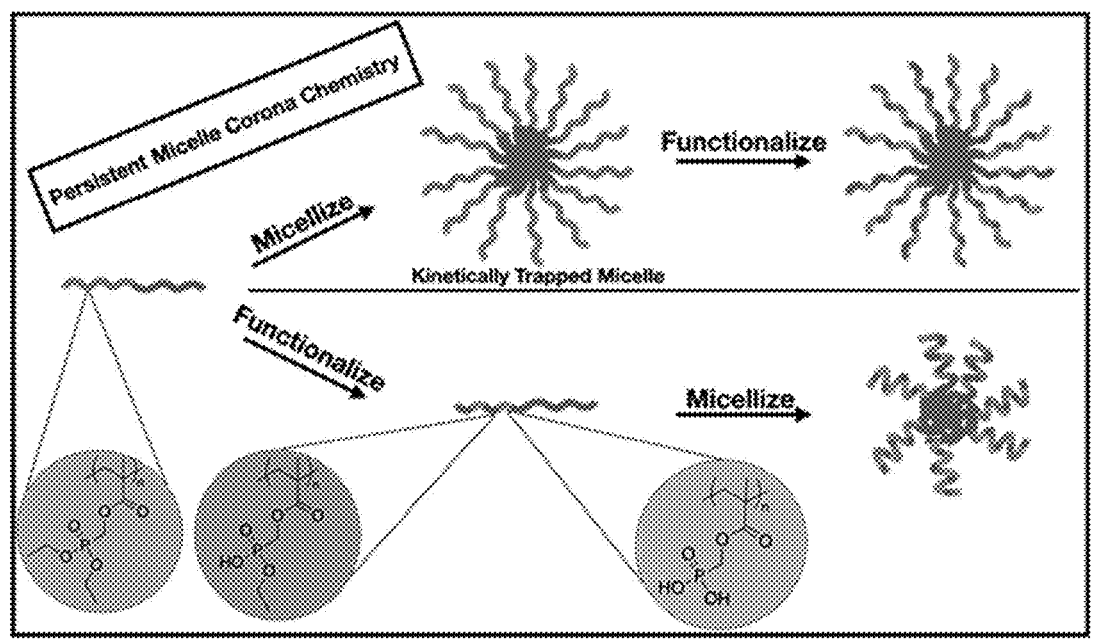
FIG. 3 is a schematic showing pathway dependence of synthesis steps according to two embodiments disclosed herein. The top path begins with kinetically trapped polymer micelles and ends with functionalization via hydrolysis ("micellized-then-hydrolyzed"). The bottom path begins with functionalization and ends with micellization ("hydrolyzed-then-micellized").
Figure 4A:
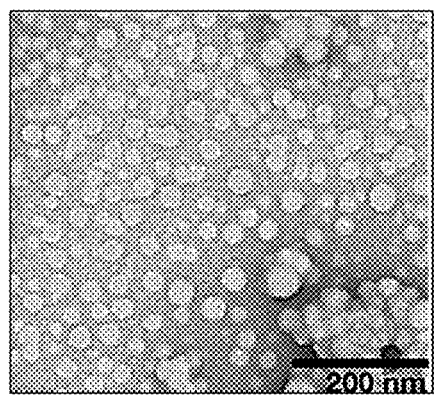
FIG. 4A presents a TEM image of PCHMA-b-PDEPMMA micelles dispersed in 1 mM NaOH as a function of synthesis pathway for hydrolyzed-then-micellized at 0% hydrolysis. The samples were stained with uranyl acetate which selectively associates with the phosphonate coronas (dark) and does not associate with the PCHMA cores (light).
Figure 4B:
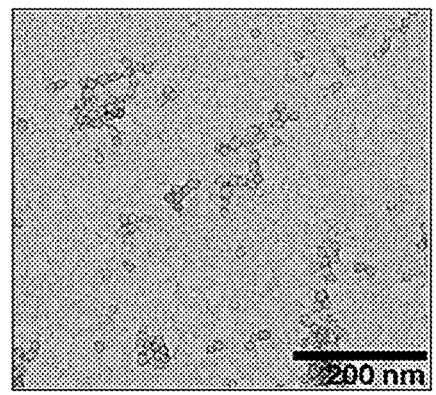
FIG. 4B presents a TEM image of PCHMA-b-PDEPMMA micelles dispersed in 1 mM NaOH as a function of synthesis pathway for hydrolyzed-then-micellized at 100% hydrolysis. The samples were stained with uranyl acetate which selectively associates with the phosphonate coronas (dark) and does not associate with the PCHMA cores (light).
Figure 5A:
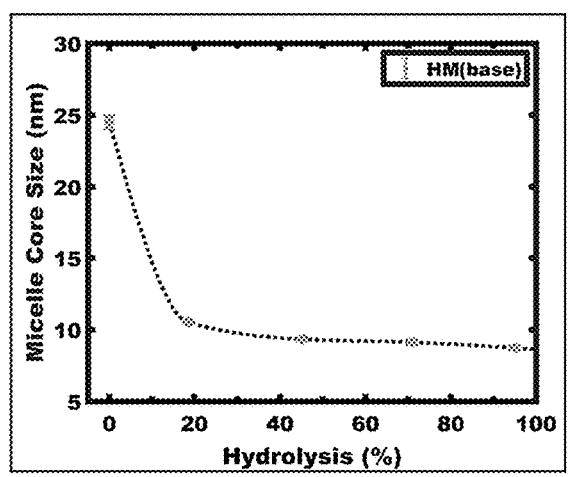
FIG. 5A presents the trend in micelle core size for the hydrolyze-then-micellize (HM) sample series dispersed in 1 mM NaOH (HM(base) series) as a function of the degree of hydrolysis.

A specific order of operations is essential to the PMCC concept. The equilibrium size and morphology of di-block polymer micelles is affected in part by Coulombic interactions. This dependence is shown first before presenting an example of the PMCC approach. Micelles were prepared from the above series of block polymers with varied extent of functionalization. These block polymers were dispersed as unimers in THF and were then micellized using a basic solution (1 mM NaOH) in order to fully deprotonate the phosphonic acid moieties of the PDEPMMA. The THF was subsequently removed selectively by evaporation. This processing sequence was denoted as "hydrolyzed-then-micellized" (HM(base)) (FIG. 3). Here, samples were named for the preparation method and the targeted extent of hydrolysis where HM(base)-100 has 95.1 mol. % of ester groups hydrolyzed. The effects of the phosphonic acid content upon the micelle core size was examined using TEM (FIG. 4A; FIG. 4B). Here, the core size is a proxy for the aggregation number. The average micelle core diameters were calculated as the average of 60 measurements for each degree of hydrolysis (Table 2). The TEM samples were prepared by staining with 1% uranyl acetate that selectively associated with the PDEPMMA coronas (dark) and did not stain the PCHMA core (light). This series of HM(base) samples had a monotonically decreasing average core diameter as the extent of hydrolysis increased (FIG. 5A). For example, HM(base)-0 and HM(base)-100 had average core diameters of 24.51 nm and 8.73 nm, respectively, a significant 3× variation in core diameter suggesting a 27× variation in aggregation number based upon the change in volume (Table 2; FIG. 5A). This trend is consistent with increasing repulsive electrostatic interactions favoring micelles with a lower aggregation number to increase the distance between corona blocks. Thus, the hydrolyzed-then-micellized route leads to drastic changes in the aggregation number and size of the micelle cores.

TABLE 2

| TMSBr/Ester Group | Hydrolysis (mol. %)* | Di-Ester (1) (mol. %)* | Mono-Acid (2) (mol. %)* | Di-Acid (3) (mol. %)* |
|---|---|---|---|---|
| 0 | 0 | 100 | 0 | 0 |
| 10 | 7.1 | 85.7 | 14.3 | 0 |
| 20 | 18.6 | 67.0 | 28.9 | 4.1 |
| 30 | 29.1 | 50.0 | 41.7 | 8.2 |
| 40 | 40.6 | 35.0 | 50.2 | 15.5 |
| 50 | 45.2 | 28.7 | 52.2 | 19.2 |
| 60 | 60.3 | 13.0 | 53.5 | 33.5 |
| 70 | 70.9 | 5.9 | 46.5 | 47.7 |
| 80 | 80.9 | 1.7 | 34.9 | 63.4 |
| 90 | 89.6 | 0 | 20.9 | 79.1 |
| 100 | 95.1 | 0 | 9.9 | 90.1 |

Figure 4C:
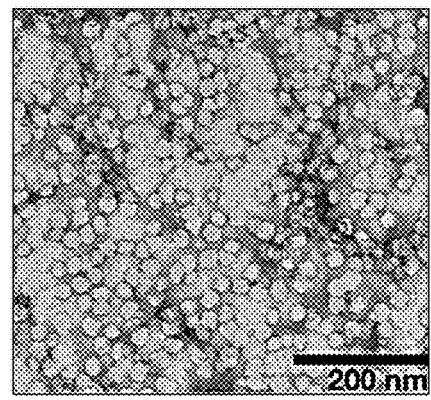
FIG. 4C presents a TEM image of PCHMA-b-PDEPMMA micelles dispersed in 1 mM NaOH as a function of synthesis pathway for micellized-then-hydrolyzed at 0% hydrolysis. The samples were stained with uranyl acetate which selectively associates with the phosphonate coronas (dark) and does not associate with the PCHMA cores (light).
Figure 4D:
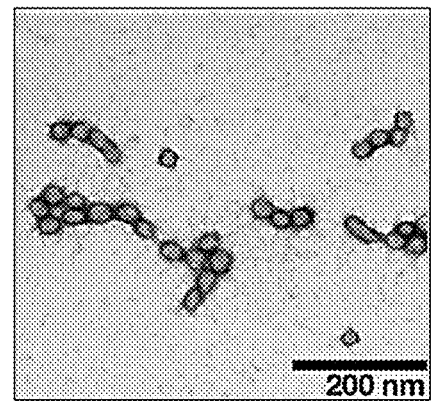
FIG. 4D presents a TEM image of PCHMA-b-PDEPMMA micelles dispersed in 1 mM NaOH as a function of synthesis pathway for micellized-then-hydrolyzed at 100% hydrolysis. The samples were stained with uranyl acetate which selectively associates with the phosphonate coronas (dark) and does not associate with the PCHMA cores (light).
Figure 5B:
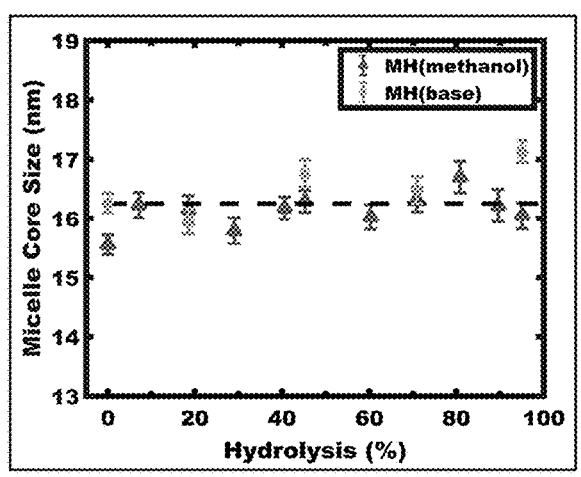
FIG. 5B presents the trend in micelle core size for the micellize-then-hydrolyze (MH) sample series dispersed in either methanol (MH(methanol) series) or in 1 mM NaOH (MH(base) series) as a function of the extent of hydrolysis. The error bars correspond to the standard-error-of-the-mean.
Figure 6A:
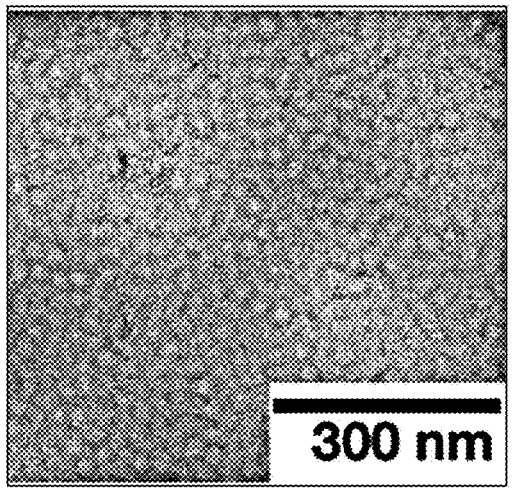
FIG. 6A presents a TEM image of PCHMA-b-PDEPMMA micelles that were micellized-then-hydrolyzed (MH series) for MH(methanol)-0.
Figure 6B:
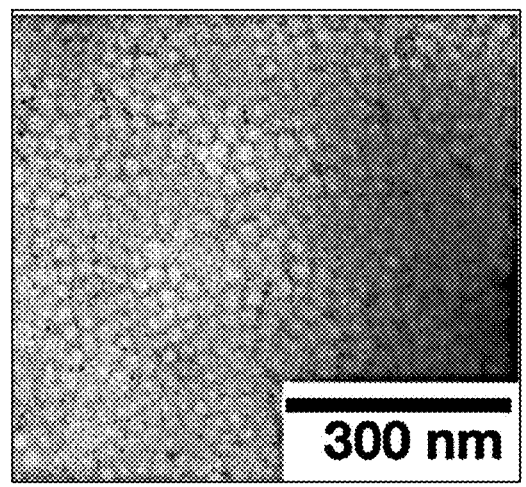
FIG. 6B presents a TEM image of PCHMA-b-PDEPMMA micelles that were micellized-then-hydrolyzed (MH series) for MH(methanol)-10.
Figure 6C:
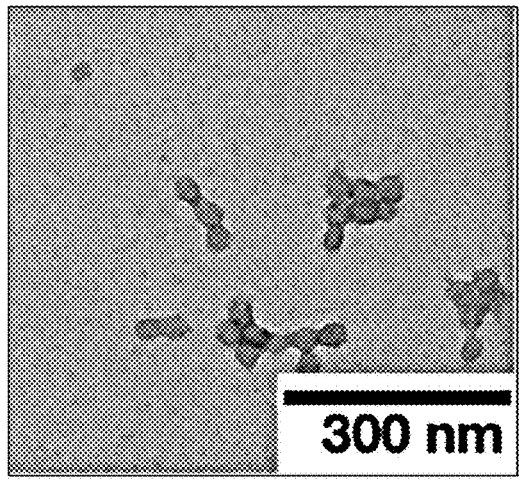
FIG. 6C presents a TEM image of PCHMA-b-PDEPMMA micelles that were micellized-then-hydrolyzed (MH series) for MH(methanol)-20.
Figure 6D:
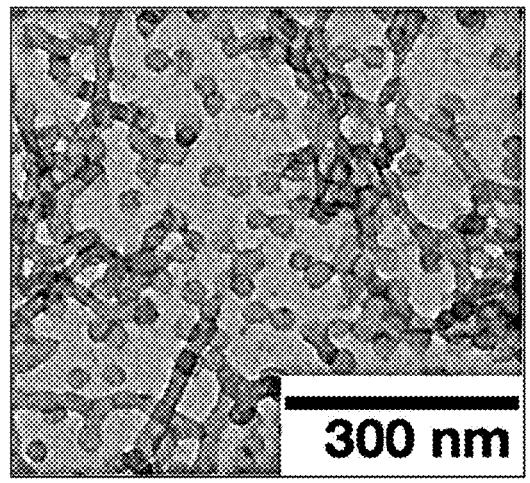
FIG. 6D presents a TEM image of PCHMA-b-PDEPMMA micelles that were micellized-then-hydrolyzed (MH series) for MH(methanol)-30.
Figure 6E:
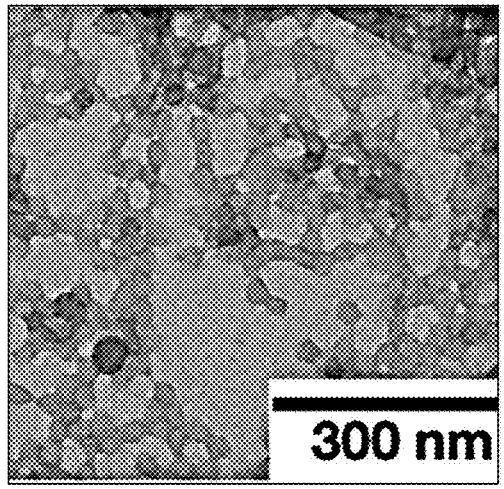
FIG. 6E presents a TEM image of PCHMA-b-PDEPMMA micelles that were micellized-then-hydrolyzed (MH series) for MH(methanol)-40.
Figure 6F:
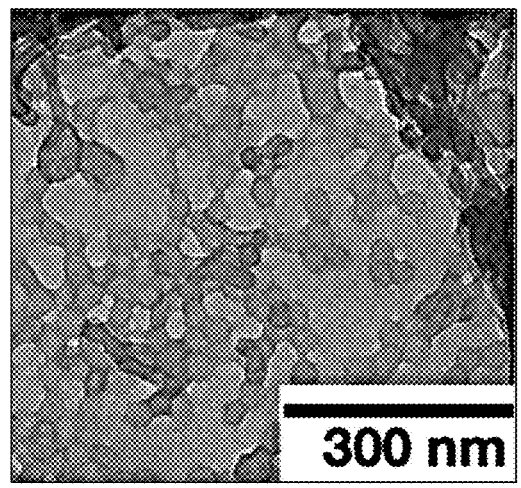
FIG. 6F presents a TEM image of PCHMA-b-PDEPMMA micelles that were micellized-then-hydrolyzed (MH series) for MH(methanol)-50.
Figure 6G:
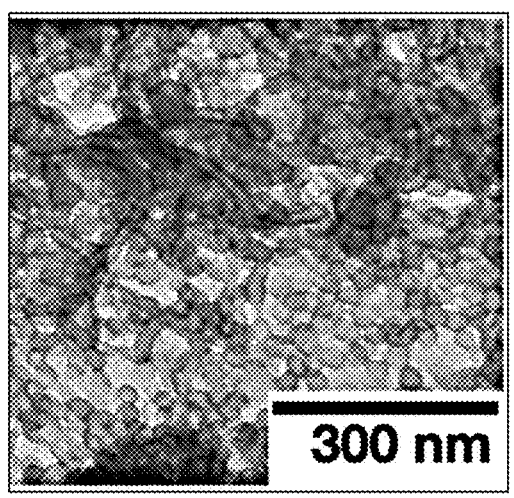
FIG. 6G presents a TEM image of PCHMA-b-PDEPMMA micelles that were micellized-then-hydrolyzed (MH series) for MH(methanol)-60.
Figure 6H:
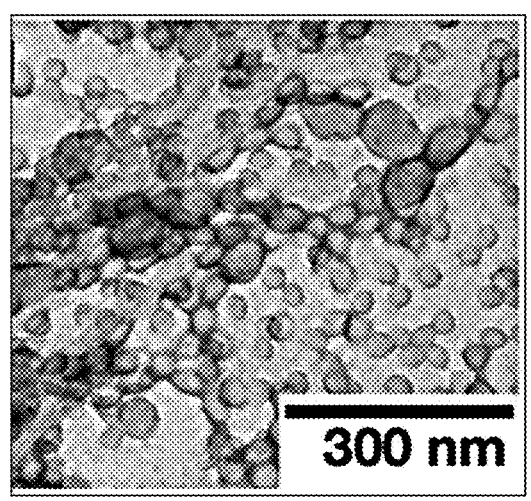
FIG. 6H presents a TEM image of PCHMA-b-PDEPMMA micelles that were micellized-then-hydrolyzed (MH series) for MH(methanol)-70.
Figure 6I:
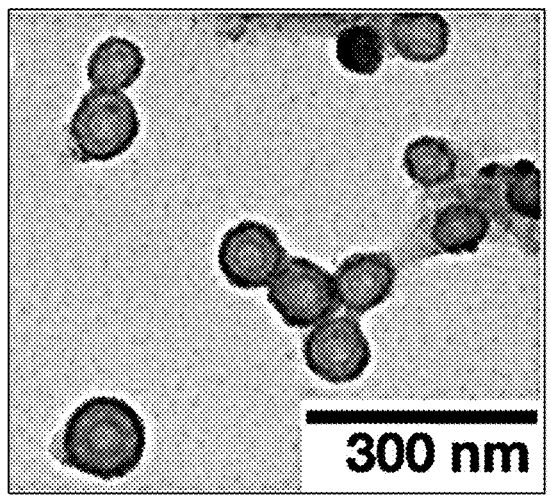
FIG. 6I presents a TEM image of PCHMA-b-PDEPMMA micelles that were micellized-then-hydrolyzed (MH series) for MH(methanol)-80.
Figure 6J:
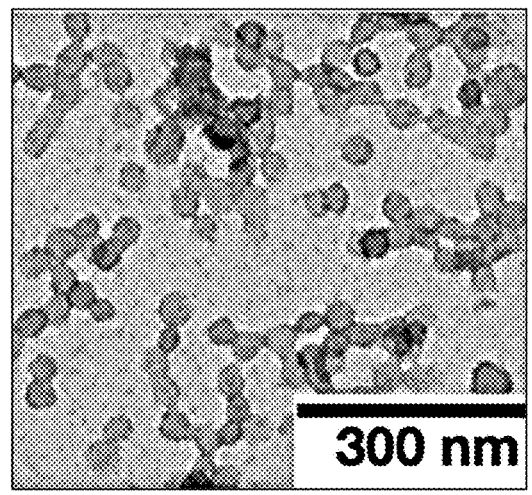
FIG. 6J presents a TEM image of PCHMA-b-PDEPMMA micelles that were micellized-then-hydrolyzed (MH series) for MH(methanol)-90.
Figure 6K:
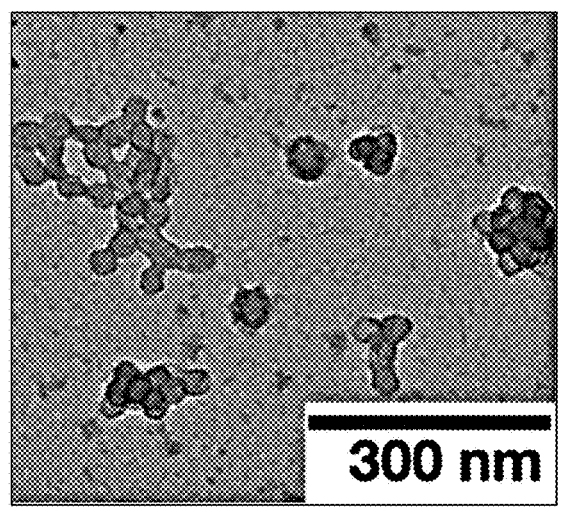
FIG. 6K presents a TEM image of PCHMA-b-PDEPMMA micelles that were micellized-then-hydrolyzed (MH series) for MH(methanol)-100.

Inhibition of chain exchange mechanisms while functionalizing is the essence of the PMCC concept (FIG. 3). Toward this end, the PCHMA-b-PDEPMMA was dissolved as unimers in THF and was next micellized by adding acetonitrile as checked by DLS (FIG. 13). Next, the complete removal of good solvent (THF) is necessary in order to kinetically trap the micelles through immobilization of the glassy PCHMA core block. Please note that one must remove all traces of good solvent to avoid plasticization the core block. We note that the PMCC concept does not explicitly require the use of a glassy core since high-xN solution conditions can also suppress chain exchange and micelle reorganization. These glassy persistent micelles were subsequently functionalized via hydrolysis. Again, the phosphonated esters of the PDEPMMA blocks were subjected to quantitative hydrolysis using TMSBr to result in a range of hydrolysis extents from 0-95.1 (mol. %) (Table 1). After functionalization, the sample series was dried to a powder, then redispersed in methanol, followed by the dropwise addition of the same 1 mM NaOH base solution and evaporative removal of the methanol. This series was termed "micellized-then-hydrolyzed," specifically dispersed in basic media (MH(base)). Again, the deprotonation of the phosphonic acid moieties (pH 11) and the associated increase in corona charge density is expected to lead to a large change in the equilibrium aggregation number. The observed trend in aggregation number was again measured using TEM imaging (FIG. 4C; FIG. 4D). In contrast to the 3× variation in core diameter size across the HM(base) series, the MH(base) series had core sizes ranging from 16.0±0.2 nm to 17.1±0.2 nm, consistent with minor random variation about a constant mean (Table 2; FIG. 5B). It can be inferred that these micelles did not progress towards the various equilibrium aggregation numbers due to kinetic entrapment. We note that this approach thus enables a series with a constant core diameter and variable charge density. These data demonstrate the remarkable impact of the synthetic pathway dependence upon the final micelle characteristics. Thus, it was shown that the PMCC method enables micelle series with variable functionalization and constant aggregation number.

TABLE 3

| | HM(base) 0 | HM(base) 20 | HM(base) 50 | HM(base) 70 | HM(base) 100 | MH(base) 0 | MH(base) 20 | MH(base) 50 | MH(base) 70 | MH(base) 100 |
|---|---|---|---|---|---|---|---|---|---|---|
| | Sample Name | | | | | | | | | |
| Average Core Size (nm) | 24.51 ± 0.41 | 10.53 ± 0.13 | 9.34 ± 0.09 | 9.13 ± 0.15 | 8.73 ± 0.12 | 16.26 ± 0.18 | 15.95 ± 0.18 | 16.76 ± 0.23 | 16.48 ± 0.19 | 17.13 ± 0.19 |
| Standard Deviation (nm) | 3.17 | 1.00 | 0.69 | 1.15 | 0.95 | 1.43 | 1.38 | 1.78 | 1.48 | 1.49 |

Lastly, we examined the robustness of these persistent micelles towards a wide sweeping change in Coulombic interaction strength. The "micellized-then-hydrolyzed" series were also characterized at the point of redispersion into neat methanol, (MH(methanol)). TEM images of this sample series are shown in FIG. 6. Again, the TEM measurements revealed that the average core sizes were relatively constant, ranging from 15.6±0.2 nm to 16.7±0.3 nm, again suggestive of minor random variation about a constant mean (Table 4; FIG. 5B). Comparison of sample series MH(base) to MH(methanol) show that a constant nominal core size is maintained in multiple solvents. Furthermore, these series showed constant nominal core size with widely varying charge density since the MH(base) series had a pH of 11 that deprotonates all phosphonic acid moieties. This constant core diameter again demonstrates a lack of chain exchange during the significant changes in Coulombic interaction strength. Thus, the PMCC approach enables micelle series which preserve constant aggregation number during variable functionalization and switchable pH stimuli that modulate the Coulombic interaction strength.

CONCLUSIONS

This work demonstrates that the PMCC enables constant micelle core size while functionalizing the micelle corona and changing the strength of the corona Coulombic interactions. The judicious selection of polymer chemistry, processing solvents, and processing pathways are crucial to maintaining kinetic micelle control while conducting chemical transformations upon the corona chains. In contrast, the typical approach of functionalize-then-micellize was shown to lead to variation of the resulting micelle aggregation number. The PMCC concept was demonstrated using the hydrolysis and subsequent deprotonation of PDEPMMA coronas on PCHMA-b-PDEPMMA micelles as verified by NMR and TEM experiments. Here, the combination of performing functionalization in a solvent that i) did not plasticize the core blocks, ii) solvated the PDEPMMA corona chains throughout the entire functionalization process, and iii) was compatible with the functionalization reaction was crucial. Though these constraints are many, the use of solubility databases and creative polymer chemistry often enable the identification of suitable combinations. It was shown that careful constraint management enabled the extent of functionalization and the charge density response towards pH to be fully tunable while maintaining kinetic micelle control. Using this method, one can independently study the effects of varied corona acid content of their choosing without associated changes to the nominal micelle core size. Similarly, one can independently tailor the micelle charge density.

These and other modifications and variations to the present invention may be practiced by those of ordinary skill in the art, without departing from the spirit and scope of the present invention, which is more particularly set forth in the appended claims. In addition, it should be understood the aspects of the various embodiments may be interchanged both in whole or in part. Furthermore, those of ordinary skill in the art will appreciate that the foregoing description is by way of example only, and is not intended to limit the invention so further described in the appended claims.

TABLE 4

| | MH (methanol) 0 | MH (methanol) 10 | MH (methanol) 20 | MH (methanol) 30 | MH (methanol) 40 | MH (methanol) 50 | MH (methanol) 60 | MH (methanol) 70 | MH (methanol) 80 | MH (methanol) 90 | MH (methanol) 100 |
|---|---|---|---|---|---|---|---|---|---|---|---|
| | Sample Name | | | | | | | | | | |
| Average Core Size (nm) | 15.55 ± 0.16 | 16.23 ± 0.21 | 16.15 ± 0.24 | 15.78 ± 0.23 | 16.17 ± 0.19 | 16.29 ± 0.19 | 16.02 ± 0.21 | 16.31 ± 0.20 | 16.70 ± 0.27 | 16.22 ± 0.27 | 16.05 ± 0.22 |
| Standard Deviation (nm) | 1.26 | 1.65 | 1.84 | 1.76 | 1.46 | 1.45 | 1.64 | 1.56 | 2.09 | 2.13 | 1.71 |

What is claimed:

1. A method of forming persistent micelles, comprising:
    dissolving a block copolymer in a first solvent to form a dispersion containing unimers or dynamic micelles, wherein the block copolymer comprises poly (cyclohexyl methacrylate-b-(diethoxyphosphoryl) methyl methacrylate); and
    contacting the dispersion with a second solvent forming the persistent micelles.

2. The method of claim 1, further comprise maintaining a diameter of the persistent micelles while independently adjusting a functional group density of the persistent micelles.

3. The method of claim 1, further comprise maintaining a diameter of the persistent micelles while independently tailoring a Coulombic interaction strength of the persistent micelles.

4. The method of claim 1, wherein the block copolymer comprises a core block and a corona block.

5. The method of claim 1, wherein the block copolymer has a molar mass between about 20 kg/mol and about 100 kg/mol.

6. The method of claim 4, wherein the core block comprises a methacrylate derivative.

7. The method of claim 4, wherein the corona block comprises a polyphosphonated ester.

8. The method of claim 1, wherein the first solvent is a non-selective solvent.

9. The method of claim 1, wherein the first solvent comprises tetrahydrofuran (THF), methylene chloride, chloroform, or a combination thereof.

10. The method of claim 1, wherein the second solvent comprises acetonitrile, methanol, ethanol water, or a combination thereof.

11. The method of claim 1, further comprising contacting the dispersion with a reagent resulting in functionalization of the persistent micelles.

12. The method of claim 11, wherein the reagent comprises bromotrimethylsilane (TMSBr), methanol, water or a combination thereof.

13. The method of claim 11, wherein the persistent micelles further comprise a mono acid, a diacid, or a combination thereof.

14. The method of claim 11, wherein the persistent micelles comprise a zeta potential from about 0 mV to 15 mV.

15. The method of claim 1, wherein average core diameter of the persistent micelles ranges from about 10 nm to about 200 nm.

* * * * *